(12) United States Patent
Deshpande et al.

(10) Patent No.: US 8,782,166 B1
(45) Date of Patent: **\*Jul. 15, 2014**

(54) SYSTEM FOR GENERATING A SITE PATHING REPORT BASED ON REAL-TIME ANALYTICS DATA

(75) Inventors: Mayur Venktesh Deshpande, Long Beach, CA (US); Kasem Marifet, Costa Mesa, CA (US); Jacob Burton Matthews, Chicago, IL (US); James Lee Wogulis, Laguna Beach, CA (US); Linus Page Chou, San Francisco, CA (US)

(73) Assignee: Google Inc., Mountain View, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 13/187,461

(22) Filed: Jul. 20, 2011

(51) Int. Cl.
*G06F 15/16* (2006.01)
*G06F 15/173* (2006.01)

(52) U.S. Cl.
USPC ............ 709/217; 709/223; 709/224; 709/238

(58) Field of Classification Search
USPC ......................................... 709/238, 224, 217
See application file for complete search history.

(56) References Cited

U.S. PATENT DOCUMENTS

| | | | | |
|---|---|---|---|---|
| 6,792,458 | B1 * | 9/2004 | Muret et al. ................... | 709/224 |
| 7,610,289 | B2 * | 10/2009 | Muret et al. ............................ | 1/1 |
| 2002/0042821 | A1 * | 4/2002 | Muret et al. ................... | 709/223 |
| 2002/0120727 | A1 * | 8/2002 | Curley et al. ................. | 709/223 |
| 2003/0009514 | A1 * | 1/2003 | Kasvand et al. .............. | 709/202 |
| 2005/0256951 | A1 * | 11/2005 | Shapira et al. ................ | 709/223 |
| 2005/0256954 | A1 * | 11/2005 | Shapira et al. ................ | 709/224 |
| 2007/0124471 | A1 * | 5/2007 | Harada et al. ................. | 709/225 |
| 2008/0208947 | A1 * | 8/2008 | Shapira et al. ................ | 708/650 |
| 2009/0271514 | A1 * | 10/2009 | Thomas et al. ................ | 709/224 |
| 2010/0049847 | A1 * | 2/2010 | Muret et al. .................. | 709/224 |
| 2010/0075707 | A1 * | 3/2010 | Fritsch et al. ................. | 455/517 |
| 2011/0082936 | A1 * | 4/2011 | Breslin et al. ................ | 709/226 |
| 2011/0107241 | A1 * | 5/2011 | Moore .......................... | 715/760 |
| 2012/0030344 | A1 * | 2/2012 | Karenos et al. .............. | 709/224 |
| 2014/0032306 | A1 * | 1/2014 | Sukornyk et al. .......... | 705/14.43 |

OTHER PUBLICATIONS

"The Web Doesn't Wait—Neither Should You," Chartbeat—Real-Time Website Analytics and Uptime Monitoring, http://chartbeat.com/.
"Adobe SiteCatalyst—Actionable Web Analytics," Online Analytics—Web Analytics—SiteCatalyst—Online Optimization by Omniture, http://www.omniture.com/en/products/online_analytics/sitecatalyst.
"Your Dots, Connected," Webtrends, Analytics, http://www.webtrends.com/Products/Analytics.
"Real Time Web Analytics," Web Analytics in Real Time—Clicky, http://getclicky.com/.

(Continued)

*Primary Examiner* — David Lazaro
*Assistant Examiner* — Mahran Abu Roumi
(74) *Attorney, Agent, or Firm* — Foley and Lardner LLP; John D. Lanza

(57) ABSTRACT

Machine-implemented methods for providing information to a graphical user interface for displaying web site traffic information are provided. In one aspect, the method includes acquiring low latency web site traffic data for a web site, identifying at least one path taken by at least one visitor between a plurality of web pages for the web site based on the acquired low latency web site traffic data, and providing information for a graphical representation of the identified at least one path. Systems and machine-readable media are also provided.

22 Claims, 13 Drawing Sheets

(56) References Cited

OTHER PUBLICATIONS

"Features Overview," Features Overview—Woopra, http://www.woopra.com/features/.

A. Himel, "Building Realtime Insights," Building Realtime Insights—Facebook, Mar. 15, 2011, https://www.facebook.com/note.php?note_id=10150103900258920.

"Interaction Manager Overview," Toovio—Real-Time Marketing, Simplified, http://www.toovio.com/Interaction-Manager-Overview.

"Real-Time Event Tracking. Measure Actions, Not Pages Views." Mixpanel—Real-Time Web Analytics, Funnel Analysis, http://mixpanel.com/.

\* cited by examiner

SYSTEM FOR GENERATING A SITE PATHING REPORT BASED ON REAL-TIME ANALYTICS DATA

BACKGROUND

Web site analytics involves the analysis and reporting of web site traffic data to an associated publisher. A publisher is an entity that owns and/or manages a particular web site. The publisher can monitor web site analytics data related to user visits and links to the web site by using web site analytics tools provided by third parties.

Existing web site analytics data systems work well for processing a high volume of web traffic data in order to provide interactive reports over substantial periods of time with high fidelity. However, these systems incur a high level of latency from hit occurrence to hit reporting, and also do not allow reports to segment in a fine and granular time basis. Consequently, existing web site analytics data systems have difficulty in monitoring sudden spikes or drops in traffic, or for tracking, for example, a propagation of a link to the publisher's web site over a social networking site, which can typically unfold in a time period of minutes.

Furthermore, the high latency of web site analytics reporting makes it more difficult for publishers to implement web site analytics on their web sites. Because it takes a longer period of time to report analytics data for a web site to publishers, publishers are unable to view web traffic data for their web site in a timely manner. Furthermore, because it takes a longer period of time for reports to show up, publishers also often fail to notice any erroneous deployment of web site analytics tracking code on associated web sites.

SUMMARY

According to one aspect of the disclosure, a machine-implemented method for providing information to a graphical user interface for displaying web site traffic information is described. The method includes acquiring low latency web site traffic data for a web site, identifying at least one path taken by at least one visitor ("visitation path") between a plurality of web pages for the web site based on the acquired low latency web site traffic data, and providing information for a graphical representation of the identified at least one path.

According to another aspect of the disclosure, a system for providing information to a graphical user interface for displaying web site traffic information is described. The system includes a memory comprising low latency web site traffic data for a web site, and a processor. The processor is configured to identify at least one path taken by at least one visitor between a plurality of web pages for the web site based on the low latency web site traffic data, and provide information for a graphical representation of the identified at least one path to a graphical user interface for display in the graphical user interface. The low latency web site traffic data comprises web site traffic that is received at a collecting server configured to collect the web site traffic data, and is pushed, from the collecting server to a real-time server configured to report the web site traffic to a user, and any intermediate server configured to receive the web site traffic in-between the collected server and the real-time server.

According to a further aspect of the disclosure, a machine-readable medium comprising instructions stored therein, which when executed by a machine, cause the machine to perform operations is disclosed. The operations include acquiring low latency web site traffic data for a web site, and identifying at least one path taken by a plurality of visitors between a plurality of web pages for the web site based on the acquired low latency web site traffic data. The operations also include generating a directed tree based on the identified at least one path, wherein the directed tree comprises a node representing each of the plurality of web pages and an edge between two nodes represents a visitor traversing between the two nodes, and providing information for a graphical representation of the directed tree to a graphical user interface for display within the graphical user interface.

According to yet another aspect of the disclosure, a graphical user interface for displaying web site traffic information is disclosed. The graphical user interface includes a graphical representation of at least one visitation path taken within a web site by at least one visitor between a plurality of web pages within the web site based on acquired low latency web site traffic data for the web site. The graphical representation includes an entry location for a first web page where the at least one visitor entered the web site, and at least one path taken by the at least one visitor from the entry location to a second web page or to another location within the first web page within the web site. The graphical representation also includes an exit location where the at least one visitor exited the web site.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several configurations of the subject technology are set forth in the following figures.

DETAILED DESCRIPTION

Figure 1:
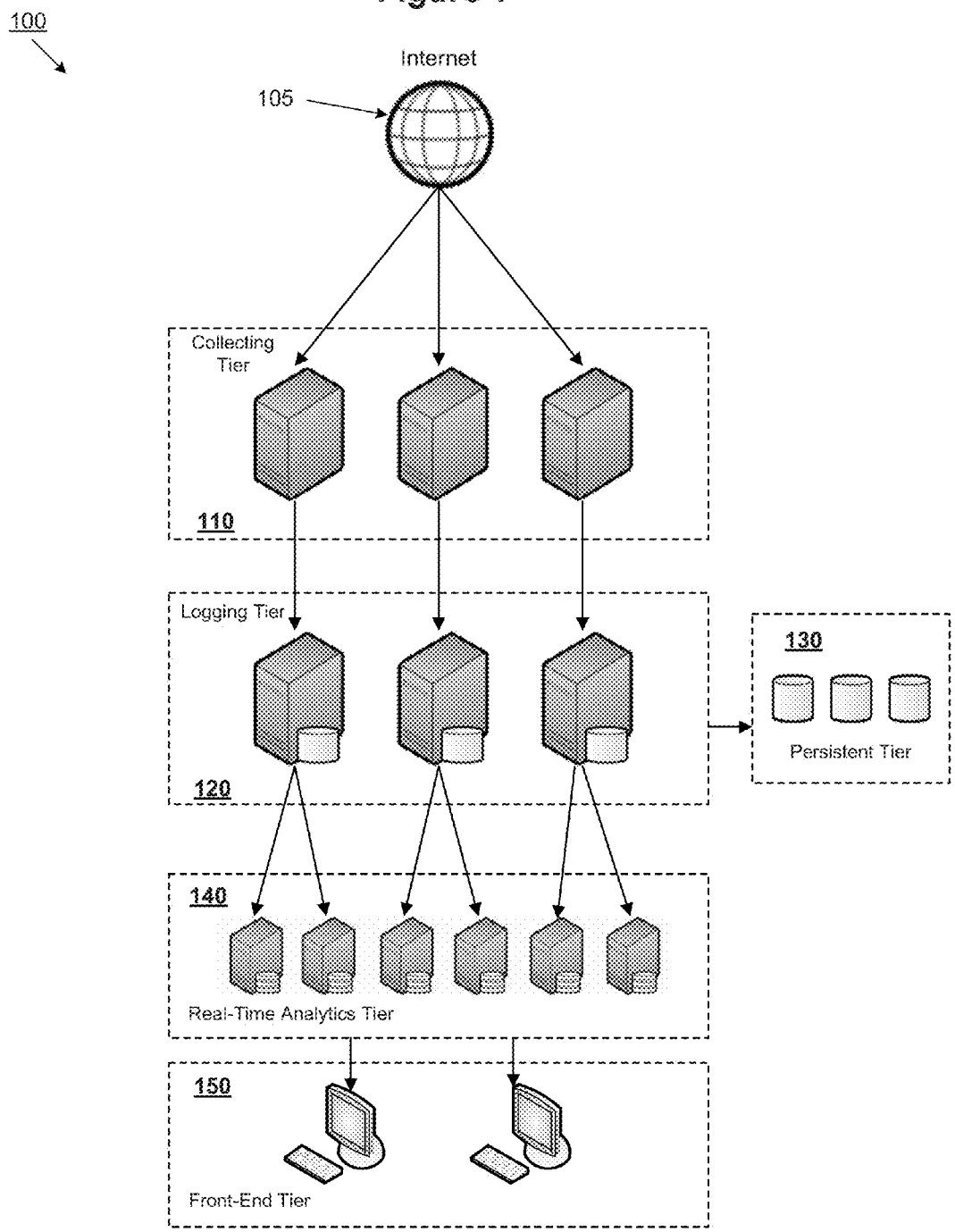
FIG. 1 illustrates an exemplary architecture diagram of a multi-tiered real-time analytics system of some configurations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Several detailed embodiments of an exemplary multi-tiered system for receiving and reporting web site traffic data are described below. Section I provides a brief introduction to an exemplary multi-tiered system architecture for receiving and reporting web site traffic data of some embodiments. Section II describes an exemplary multi-tiered system architecture for receiving and reporting web site traffic data of some embodiments. Section III then describes exemplary processing of web site traffic data for temporary or persistent storage of some embodiments. Next, Section IV describes exemplary attributes and data structures used in the multi-tiered system of some embodiments. Section V describes an exemplary software architecture of a real-time analytics server of some embodiments. Section VI describes exemplary front end web site traffic data reporting of some embodiments. Lastly, Section VII describes an exemplary electronic system, which implements some embodiments of the subject technology.

I. INTRODUCTION

Current analytics systems provide for aggregating and reporting of web site traffic data with high latency that can range from several hours to over a day. To address these issues with high latency, a real-time analytics system for receiving and reporting web site traffic data with low latency is provided. The real-time analytics system detects real-time web site traffic data on the path(s) taken by web site visitors for web pages on a web site. The real-time analytics system then displays a graphic representation of the path(s) in a useful and substantially real-time manner.

The real-time analytics system aggregates and reports web site traffic data by segmenting web site traffic data into one or more aggregation tables for presenting the web site traffic data in a useful and substantially real-time manner. In some implementations, a real-time server performs automated segmenting of tracking data included in an event tracking data communication over a rolling window of time. Once an event tracking data communication is routed to a real-time server, the real-time server 1) segments the event tracking data communication according to one or more aggregation tables and 2) stores and/or updates the included tracking data (e.g., a user identifier, an event statistic(s), such as a timestamp of the current web page event tracking data communication, and user data, such as a city or other geographical location of the user) into one or more aggregation table(s) according to a predetermined query. The real-time server of some configurations can also perform an additional operation(s) on the segmented data, such as continually sorting the segments of tracking data within each of the aggregation tables to report the top segments of the tracking data from those aggregation tables.

By way of example, for a query that requests a number of hits per city per second, the real-time server can store the tracking data by time stamp in an array data structure, and for each array element include a pointer or hash key to a respective aggregation table. Data in the aggregation table can include any associated data included with the tracking data. For example, the aggregation table can include data representing 1) a geo-location and 2) a number of associated hits in each row that is segmented by a predetermined time (e.g., seconds). The real-time server can then rank the data in the aggregation table based on a particular criterion or criteria and select particular rows of the table for presentation (e.g., to a web front-end or any other type client).

To use a web site analytics data system, a publisher typically provides tracking instructions embedded in the web site's web pages (alternatively or conjunctively, by providing code in its web page that requests the tracking instructions from an analytics server). Typically, the tracking instructions are a small region of JavaScript™ code that the publisher includes in each page of the publisher's web site for which traffic is to be tracked. When a web page is rendered by a user device and/or client (e.g., web browsers, mobile devices, tablet devices, thin clients, thick clients, etc.), the tracking instructions are executed, which collects visitor data related to one or more different user sessions and sends it back to a real-time analytics server in the form of an event tracking data communication for processing. One method of sending the event tracking data communication is to send it as part of a Hypertext Transfer Protocol (HTTP) request.

II. MULTI-TIERED SYSTEM ARCHITECTURE

Web site traffic data can be in the form of the aforementioned event tracking data communications (e.g., Hypertext Transfer Protocol (HTTP) requests that are generated from various user devices and/or clients). Each event tracking data communication can be triggered upon loading of a web page or resource (e.g., image file, banner ad, audio file, etc.) on the web site by a particular visitor to a publisher's web site. For the purpose of web site analytics reporting, the associated event tracking data (e.g., included in associated HTTP requests) can include a web property ID (e.g., an account identifier that identifies a publisher's analytics account of a particular web site), visitor identity data (i.e., corresponding to a particular user session), an event statistic(s) (such as a timestamp of the current web page communication), and user data such as location data (i.e., geographical information) associated with the visitor to the publisher's web site. The amount and types of events/information that are reported in the tracking data can be specified by the publisher (e.g., to account for particular information that a publisher wishes to track as web site analytics data).

Although an event tracking data communication is described as including web site traffic data, an event tracking data communication is not limited to including web site traffic data. In particular, an event tracking data communication can include data from any source (e.g., application, platform, etc.) that for tracking an activity associated with the source. For example, in a mobile application platform, an event tracking data communication can include event tracking data that tracks an event associated with an activity within the mobile application platform. In this example, the event tracking data associated with the mobile application platform may not include web site traffic data because the mobile application platform does not require the use of a client such as a web browser. Aspects of the multi-tiered real-time analytics system therefore can be configured to receive and process an event tracking data communication(s) including different forms of event tracking data that are outside the scope of web site tracking data.

A multi-tiered real-time analytics system as described herein can be configured to receive and process incoming event tracking data communications as described above to enable real-time reporting of web site analytics data with low latency. As used herein and discussed in further detail below, the term "real-time" corresponds with reporting web site analytics data within a specified deadline by pushing/transmitting the web site analytics data through different tiers of the multi-tiered real-time analytics system. The expression "low latency" as used herein can be therefore understood as a measurement of time that covers a time period from the reception of an event tracking data communication to the real-time reporting of the web site analytics data included therein. For instance, in certain aspects, low latency web site traffic data includes web site traffic that is received from a network at a collecting tier, and is pushed, from the collecting tier to a reporting tier (or "real-time tier"), and any intermediate tier in-between the collecting tier and the reporting tier. As illustrated in FIG. 1 and described in further detail below, the flow of event tracking data goes through several tiers for real-time web site analytics processing and reporting according to deadlines in a real-time system.

A real-time system is subject to a "real-time constraint" that can impose operational deadlines from an event to a system response. Thus, a real-time system operates within constraints on response time. In the context of the multi-tiered real-time analytics system, the flow of event tracking data through different tiers of the system is required to meet deadlines in order to report the data within a specified period of time (e.g., in a real-time manner with low latency). In one example, the real-time analytics system imposes a respective one second deadline for processing event tracking data within each tier of the system. For instance, upon receipt of an event tracking data communication, a logging server (e.g., in a logging tier described further below) must forward the event tracking data communication within a one second deadline to a real-time server (e.g., in a real-time analytics tier described below). In the event that the logging server can not meet the one second deadline, the event tracking data communication is dropped (e.g., discarded) by the logging server and no further processing occurs for that event tracking data communication. Similarly, when the real-time server receives the event tracking data communication from the logging server, the real-time server must forward the event tracking data communication to another real-time server or a front-end server (as described below) within a one second deadline. The real-time server similarly discards the event tracking data communication if it cannot meet the one second deadline. The one second deadline discussed above is just one example of the specified period of time. Other periods of time may be specified. In addition, each tier of the real-time analytics system may have a different specified period of time for processing an event tracking data communication.

FIG. 1 illustrates an exemplary architecture diagram of a multi-tiered real-time analytics system 100 for receiving and reporting web site traffic data in the form of event tracking data communications. The multi-tiered real-time analytics system 100 receives such event tracking data communications from a network 105 and routes the received communications for persistent and temporary storage to enable web analytics processing by the system. The network 105 can include, but is not limited to, a local network, remote network, or an interconnected network of networks (e.g., Internet as shown in FIG. 1).

As illustrated, the multi-tiered real-time analytics system 100 may further include a collecting tier 110, a logging tier 120, a persistent tier 130, a real-time analytics tier 140 and a front-end tier 150. Each of the aforementioned tiers can include a respective cluster of servers/computers that perform a same set of functions in a distributed and/or load balanced manner. A cluster can be understood as a group of servers/computers that are linked together to seamlessly perform the same set of functions, which can provide performance, reliability and availability advantages over a single server/computer architecture. For the sake of simplicity, each illustrated tier depicts several number of servers. However, one of ordinary skill in the art would realize that the illustrated tiers could include any number of servers and still be within the scope of the subject technology. The descriptions of the various tiers of the system 100 are explained in further detail below.

In some configurations, the collecting tier 110 receives incoming event tracking data communications from the network 105. The collecting tier 110 includes at least one collecting server that is configured to receive and forward the event tracking data communication. Each collecting server of the collecting tier 110 can process an incoming event tracking data communication to determine a particular server in the logging tier 120 to route the event tracking data communication. In some implementations, the collecting server can utilize a load balancing technique to determine which logging server in the logging tier 120 to route the event tracking data communication. The load balancing technique can be based upon different factors such as server load, network load, and/or any other suitable computing metric for measuring resource utilization at a particular server.

The logging tier 120 can receive a routed event tracking data communication from a particular collecting server of the collecting tier 110. Upon receiving the event tracking data communication, the subsequent tasks of the logging tier 120 can be understood as being two-fold: 1) route received event tracking data communications to the persistent tier 130 for persistent storage (e.g., of historical web site tracking data) and 2) route received event tracking data communication to the real-time analytics tier 140 for temporary storage (e.g., of low latency or real-time web site tracking data).

To accomplish the aforementioned tasks, the logging tier 120 includes at least one logging server that is configured to receive the routed event tracking data communication from the collecting server. In some implementations, the logging server aggregates incoming event tracking data communications and then periodically routes the aggregated event tracking data communications to the persistent tier 130 for persistent storage. Each event tracking data communication is associated with a particular web site of a publisher and the aggregated event tracking data communications can originate from disparate associated web sites and/or the same web site. In some implementations, the logging server can be further configured to verify each routed event tracking data communication to guarantee delivery of the event tracking data communications to a particular long-term storage server in the persistent tier 130.

For persistent storage of the event tracking data communication, the persistent tier 130 of some configurations can include at least one long-term storage server. Each long-term storage server includes a non-volatile storage device(s), a database(s), or other similar non-volatile storage medium for persistent storage of an incoming event tracking data communication. Persistent storage as used herein can be understood as referring to a type of non-volatile storage that stores the event tracking data in a reliable manner. In some configurations, persistent storage can include lossless or near-lossless storage in which the data is stored without being deleted and/or replaced at a subsequent time period. Additionally, persistent storage can be characterized as storing event tracking data in a form of historical records so that the system can extract the stored tracking data at a later period of time. In some configurations, the stored event tracking data can be modified at a later time period. Alternatively, the stored event tracking data can be in the form of immutable records (i.e., data that is not modified after being stored).

To improve the reliability of the persistent storage, some implementations of the persistent tier 130 can replicate the stored event tracking data across another long-term storage server so that the tracking data is mirrored in at least one other long-term storage server. For instance, the long-term storage server that receives a particular event tracking data communication can then undergo a replication process (either initiated by the long-term storage server itself, a second long-term storage server, or another server in the multi-tiered system) to copy (i.e., replicate) the particular event tracking data to another long-term storage server. Data redundancy can therefore be provided to enable fault tolerance in the event the data stored at one long-term storage server is corrupted and/or lost.

To meet the low latency requirements for a multi-tiered real-time analytics system, the system can employ a lossy scheme for reporting web site traffic data in which some loss of event tracking data is tolerated. In particular, because the event tracking data is stored in persistent storage as described above, the multi-tiered real-time analytics system can adopt certain trade-offs for the sake of minimizing latency when routing the event tracking data to the real-time analytics tier as described further below.

Each logging server of the logging tier 120 is further configured to route event tracking data communications to the real-time analytics tier 140 for temporary storage. Given the requirement of low latency (i.e., minimizing latency in the system) connected with reporting real-time analytics data, each logging server can be configured to route the event tracking data communications to the real-time analytics tier 140 at a greater frequency than routing the communications to the persistent tier 130. In some implementations, routing the tracking data communications to the real-time analytics tier 140 can be understood as occurring asynchronously with routing the communications to the persistent tier 130.

The real-time analytics tier 140 includes at least one real-time server that is configured to receive the routed event tracking data communication from the logging tier 120. The real-time server in some implementations is configured to aggregate and/or sort the event tracking data according to one or more predetermined criteria for real-time reporting of the web site analytics data to a publisher. As described before, each event tracking data communication can include visitor identity data corresponding to a user session, location data associated with the user/visitor, and a timestamp corresponding to the visitor action.

The real-time server of some implementations can process the aforementioned data to generate real-time analytics data for temporary storage. For instance, the real-time server can aggregate and sort the location data according to the timestamp of the visitor action and then temporarily store the aggregated and/or sorted real-time analytics data. One of ordinary skill in the art would appreciate that other criteria can be used for aggregating and sorting the real-time analytics data. In one aspect, the real-time server sends the aggregated and/or sorted real-time analytics data to the front-end tier 150 for reporting the real-time analytics data. Moreover, as used herein, temporary storage can be understood as providing volatile, quick access to data (in comparison to persistent storage) stored in a storage device such as volatile memory (e.g., random access memory).

Alternatively to the above, the front-end tier 150 in one aspect can run queries on the stored real-time analytics data to report to the publisher with low latency. For instance, the real-time server can be configured to process incoming queries from the front-end tier 150 on the stored real-time analytics data. The real-time server can return matching real-time analytics data based on the queries to the front-end tier 150 for real-time presentation with low latency.

In some implementations, the system 100 includes the front-end tier 150, which includes at least one front-end server configured to report the real-time analytics data with low latency. As described above, the front-end server of some implementations is configured to receive real-time analytics data from the real-time server. By way of example, the front-end server can receive real-time web analytics data associated with a particular location (e.g., city, state, country, etc.) over a predetermined time period for presentation at a front-end interface (i.e., graphical user interface) to an end-user. One of ordinary skill in the art would understand that any set of real-time analytics data could be received for reporting the analytics data in a real-time manner.

Although the above description provides that system 100 includes several tiers, one of ordinary skill in the art would appreciate that in some configurations respective tiers could be combined to function as a single tier and still be within the scope of the subject technology. For instance, the above described collecting and logging tiers could be implemented as a single tier that perform a combined set of functions.

Moreover, to facilitate communication between the respective tiers as described above, the respective tiers can be configured to communication over a type of network, such as a local area network, a wide area network, or an interconnected network of networks (e.g., the Internet) and by using any sort of network/communications protocol (Transmission Control Protocol and Internet Protocol (TCP/IP), HTTP, etc.).

In addition, different configurations of the multi-tiered system can be organized in different ways. For instance, different tiers could be located in different geographical locations. Each geographical location can be associated with a respective data center that includes one or more servers associated with a particular tier. Alternatively or conjunctively, the respective servers in one particular tier could be located in one or more different geographical locations and/or data centers. This flexibility in organizing the multi-tiered system provides an advantage of increasing the scalability of the system to include servers across potentially disparate physical locations.

III. PROCESSING OF WEB SITE TRACKING DATA COMMUNICATIONS

In the following section, respective exemplary processes for routing an event tracking data communication to a real-time server and processing the tracking data communication by the real-time server are described in further detail.

Figure 2:
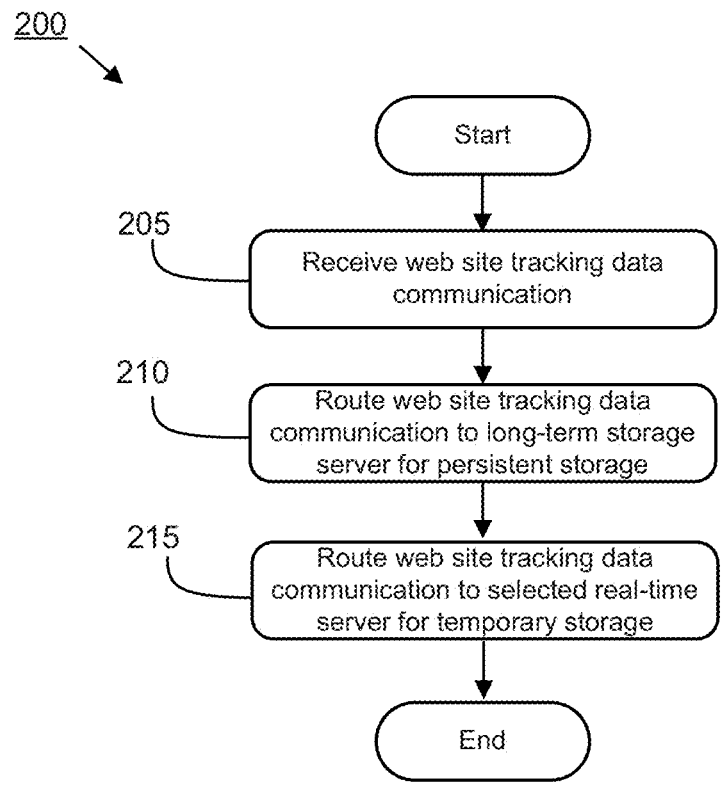
FIG. 2 conceptually illustrates an exemplary process for routing an event tracking data communication for persistent and temporary storage of some configurations.

FIG. 2 conceptually illustrates an exemplary process 200 for routing an event tracking data communication for persistent and temporary storage of some configurations. More specifically, FIG. 2 illustrates the process performed by a logging server to route event tracking data communications to a persistent tier and to a real-time analytics tier. The process 200 of FIG. 2 will be described by reference to corresponding portions of FIG. 1.

The process 200 starts when an event tracking data communication is received at 205. By reference to FIG. 1, the logging server in the logging tier 120 receives the event tracking data communication from a collecting server in the collecting tier 110. In some implementations, the logging server can receive the web site communication when pushed from the collecting server. For example, instead of the logging server utilizing a client pull technique to request an event tracking data communication, the tracking data communication is pushed as a server push from the collecting server to the logging server. Hence, the latency of receiving the event tracking data communication is decreased because the aforementioned data flow reduces the typical overhead associated with a traditional request/response communication flow.

The process 200 can then perform the task of routing the received web site to separate tiers. At 210, the event tracking data communication is routed to a long-term storage server (e.g., in the persistent tier 130 from FIG. 1) for persistent storage. Referring to FIG. 1, the logging server in the logging tier 120 routes the event tracking data communication to the long-term storage server in persistent tier 130. In some implementations, the logging server can queue several received event tracking data communications for routing the tracking data communications in a batch manner. When the logging server performs the steps in the process 200, some implementations can further verify the delivery of the event tracking data communication to the long-term storage server in order to guarantee the delivery of the communication.

The process 200 then continues to 215 to route the event tracking data communication to a selected real-time server. Referring to FIG. 1, the real-time analytics tier 140 can include several real-time servers. The logging server in the logging tier 130 can arbitrarily select a real-time server to route the event tracking data communication. By performing an arbitrary selection of the real-time server, latency in reporting real-time analytics data can be decreased because the process 200 does not rely on any particular real-time server to process the tracking data communication. The arbitrary selection of the real-time server by the process 200 also alleviates potential processing bottlenecks by impartially distributing the event tracking data communications across the real-time servers in the real-time analytics tier 140 from FIG. 1. In some configurations, the real-time server can be selected based on different criteria. For example, the logging server can select the real-time server using a randomized selection in which a particular real-time server is randomly selected from among more than one different real-time servers. In yet other configurations, the logging server can select the real-time server based on load-balancing requirements in which one or more particular computing metrics are utilized to determine the real-time server to receive the event tracking data communication.

Additionally, the process 200 at 215 can route the event tracking data communication at a greater frequency than routing the communication to the long-term storage server. For example, when the logging server receives the event tracking data communication, the logging server can queue several tracking data communications before sending them to the long-term storage server because low latency is not a factor for the aspect of the multi-tiered system dealing with persistent storage of the event tracking data. In one aspect, the logging server can immediately or in a shorter time period route the event tracking data communication to the randomly selected real-time analytics server to ensure that the requirement of low latency processing, storing and reporting of the real-time analytics data is met. After routing the event tracking data communication to the long-term storage server and the real-time server, the process 200 then ends.

Although the above description of the process 200 describes that routing to the long-term storage server occurs before routing to the real-time server, one of ordinary skill in the art can appreciate that the described order is one exemplar and some implementations could reverse the order of the previously described routing without departing from the scope of the invention. For instance, some implementations could route the event tracking data communication to the real-time server before routing the communication to the long-term storage server. In another aspect, routing the communication to the long-term storage server and the real-time server occurs in a simultaneous and/or synchronous manner.

Figure 3:
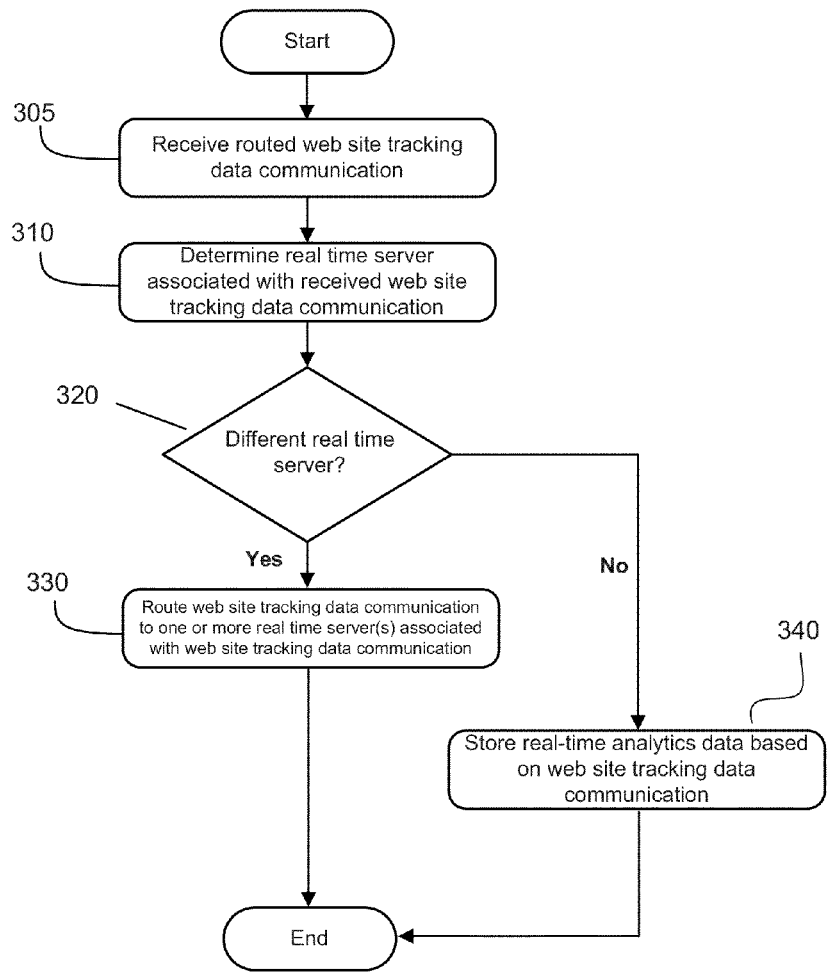
FIG. 3 conceptually illustrates an exemplary process for processing an event tracking data communication in a real-time server of some configurations.

The following discussion describes an exemplary process for processing and storing an event tracking data communication received by an arbitrarily selected real-time server. In some configurations, after the event tracking data communication is routed to the arbitrarily selected real-time server as described above in FIG. 2, the process illustrated in FIG. 3 is performed by the real-time server. More specifically, FIG. 3 conceptually illustrates an exemplary process 300 for processing an event tracking data communication in a real-time server.

The process 300 begins when a routed event tracking data communication is received at 305 in a selected real-time server. For instance, the real-time server can receive the event tracking data communication when the communication is pushed from the logging server to the real-time server. As similarly discussed above in connection with FIG. 2, the logging server can employ a push technique to push event tracking data communications to the arbitrarily selected real-time server. In other words, by pushing the event tracking data communication, the logging server initiates a communication flow without requiring an initial request from the recipient (i.e., the arbitrarily selected real-time server). Thus, an associated overhead of a typical request/request communication flow can be eliminated in the multi-tiered system. As a result, latency is reduced in the system for processing and reporting real-time analytics data.

At 310, the process 300 determines the real-time server(s) associated with the event tracking data communication. In some implementations, a real-time server(s) can be associated with a web site of a particular publisher. For instance, the real-time server can consult a table, list or other suitable data structure that indicates one or more real-time servers that are associated with the publisher's web site. The associated one or more real-time servers therefore can be considered an "owner" of any event tracking data communication for that publisher's web site. In practical terms, when acting as the owner, the associated real-time server is required to process each event tracking data communication for that publisher's web site. Based on the determination at 310, the process 300 can decide at 320 whether a different real-time server is associated with the received event tracking data communication.

In an instance in which the process 300 determines at 320 that the real-time server is not associated with the event tracking data communication, the process 300 continues to 330. At 330, the process 300 routes the event tracking data communication to one or more real-time servers associated with the event tracking data communication based on the determination at 310. Referring to FIG. 1, the real-time server can route the event tracking data communication to the associated one or more real-time servers in the real-time analytics tier 140. The process 300 then ends.

Alternatively, in an instance in which the process 300 determines at #320 that the real-time server is associated with the event tracking data communication, the process 300 continues to 340 to temporarily store real-time analytics data based on the event tracking data communication. A more detailed description of exemplars of the real-time analytics data will be discussed below in connection with FIG. 4 below. In some implementations, the process 300 temporarily stores the real-time analytics data in non-persistent storage (e.g., volatile memory, RAM, etc.). After storing the event tracking data communication, the process 300 then ends.

Although the above description describes that the process 300 determines an associated owner of the event tracking data communication at 320, one of ordinary skill in the art can appreciate that in some implementations this step is not performed (i.e., process 300 foregoes 310-330) and the process 300 immediately proceeds to 340 to store the event tracking data communication. In such implementations, the real-time server that receives the communication assumes ownership of the received communication.

IV. REAL-TIME ANALYTICS DATA STRUCTURE

The following section describes exemplar attributes and data structures of the real-time analytics data. An associated real-time server can temporarily store such attributes and data structures illustrated in FIG. 4 for reporting real-time analytics data.

Figure 4:
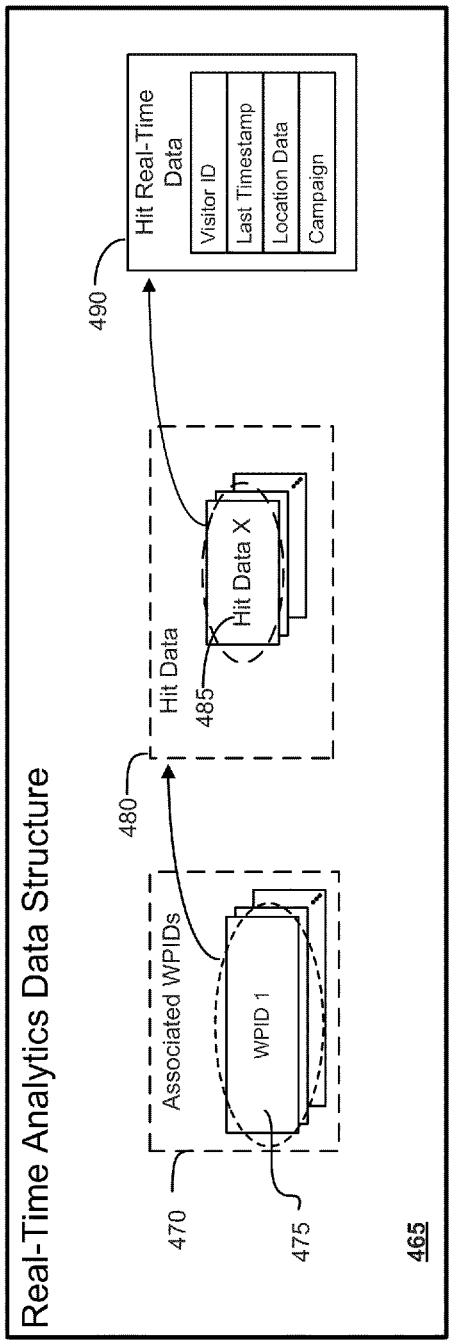
FIG. 4 conceptually illustrates different attributes and data structures that are included in some configurations of the multi-tiered real-time analytics system.

FIG. 4 conceptually illustrates different attributes and data structures that are included in some configurations of the multi-tiered real-time analytics system. More specifically, FIG. 4 depicts exemplar attributes and data structures of a real-time analytics data structure 465 that are based on event tracking data communications. For instance, an event tracking data communication can include data for identifying a user session of a visitor, a location of the visitor, and other real-time analytics attributes. A real-time server can temporarily store the real-time analytics attributes and data structures shown in FIG. 4 based on the aforementioned data included in the event tracking data communication.

In some implementations, the real-time analytics data structure 465 can be understood as a container that is a collection of the various attributes and data structures based on one or more event tracking data communication(s). As shown in FIG. 4, the real-time analytics data structure 465 includes an associated web property identity (WPID) data structure 470, associated WPID attribute 475, hit data structure 480, hit data element 485 and hit real-time data attributes 490. Although these attributes and data structures are represented as included in a single data structure, some implementations can store each of the attributes and data structures in separate data structures that include any combination of data attributes. The aforementioned attributes and data structures are described in further detail as set forth below.

As illustrated, the associated web property identity (WPID) data structure 470 includes one or more associated WPID attributes. Each associated WPID attribute can represent a publisher of a web site that is associated with the real-time server. As shown, the associated WPID attribute 475 corresponds with a publisher with a "WPID 1" that represents a unique string ID for the publisher. One of ordinary skill in the art would understand that the unique string ID could be formed from any combination of alphanumeric characters and/or symbols.

In some implementations, each associated WPID attribute can include a reference to the hit data structure 480. The hit data structure 480 includes attributes for each event tracking data communication for the publisher. As shown, the hit data structure 480 includes hit data element 485 corresponding to a particular event tracking data communication "X" for the publisher corresponding with associated WPID attribute 475. The hit data element 485 is shown in more detail in breakout section 490.

As further shown in FIG. 4, the hit data element 485 can include the real-time data attributes 490 corresponding to a visitor ID, a last timestamp, location data and campaign data. The visitor ID attribute represents a unique ID string associated with a unique visitor session. The visitor ID attribute does not necessarily identify a particular end-user but instead corresponds with a particular user session on the publisher's web site. For example, the visitor ID can be a randomized identifier that is determined based on different information such as the visitor's web browser or client, the timestamp associated with the visitor's session, and/or the visitor's hostname, etc. Additionally, the location data does not identify the visitor's personal address, but is related to a geographical location (e.g., city) that can be determined based on the IP address assigned to the visitor (e.g., by an Internet service provider).

Next, the last timestamp attribute of the real-time data attributes 490 represents the most recent timestamp in which the unique visitor visited the publisher's web site. A timestamp in some implementations is a sequence of alphanumeric characters that denotes the date and/or time in which a particular event occurred. The location data attribute represents the geographical location of the unique visitor, such as a specified city, state, county, country, zip code, global positioning system coordinates, and/or geographical coordinates (e.g., latitude, longitude, and elevation), etc. Lastly, the campaign attribute identifies a particular marketing campaign corresponding with a set of associated marketing activities. For instance, the associated marketing activities can respectively correspond to a set of web pages on the publisher's web site. Any visitor activity/action related to the set of web pages on the publisher's web page can then be associated with the marketing campaign. In this manner, the campaign attribute can identify the marketing campaign associated with the visitor action.

Different implementations can implement and organize the above described attributes and data structures in different ways. For instance, the real-time analytics data structure 465 of some configurations can be implemented as a collection of tree data structures, otherwise known as a "forest." In this exemplar, a root node of a particular tree corresponds with a particular WPTD (i.e., publisher identity) and each direct child of the root node can represent multiple visitor nodes that are associated with respective visitors to the publisher's web site. For each visitor node, visitor specific attributes are stored. Each visitor node can have multiple direct child nodes that represent the associated visitor's actions based on a timestamp. The timestamp of the last action for the associated visitor can also be stored with the parent associated visitor node described above. Alternatively or conjunctively, certain visitor attributes can be implemented as discrete nodes, such as a node including a city identifier with respective direct child nodes corresponding to a city name and geographical coordinates (e.g., latitude, longitude, etc.).

The following description describes an exemplary process for segmenting incoming event tracking data communications according to a predetermined aggregation table over a rolling window of time. In some instances, an administrator of the multi-tiered analytics system can set one or more different aggregation tables for storing different data from the incoming communications received during a specified period of time. Incoming event tracking data communications can be processed in order to extract relevant data into such aggregation tables. Each aggregation table can include corresponding event tracking data that is frequently searched/queried in reporting real-time analytics data. For instance, data related to a derived location (e.g., based from an associated Internet Protocol address from an Internet service provider), a uniform resource locator or identifier (e.g., a web page address), or an ad source (e.g., referrer) can be placed into one or more different aggregation tables.

In some instances, an administrator of the multi-tiered analytics system can set the order in which the aggregation tables are searched. In particular, the administrator can configure the system so that aggregation tables containing data that is reported more often are searched before aggregation tables containing data that is searched and reported less frequently. It should be understood that system latency can be reduced because more frequently reported data is initially searched and/or located, which reduces processing time because the system forgoes searching unlikely matching data. Thus, the multi-tiered analytics system enables prioritization in searching/querying of the event tracking data to improve latency in reporting the web analytics data.

Alternatively or conjunctively, a predetermined query can be configured by a publisher for segmenting event tracking data from incoming event tracking data communications according to different needs of the publisher. In some instances, the utilization of the predetermined query can require the creation of a custom aggregation table for storing the type of data according to the predetermined query. Similarly, the exemplary process described below can place the segmented tracking data into one or more different aggregation tables (e.g., tables that are created before the predetermined query as described above). For example, the publisher can configure the predetermined query to segment the event tracking data according to different user information and/or different visitor actions. By way of example, the publisher could be interested in segmenting each geographical location associated with respective web page requests or segmenting the event tracking data to track a number of requests to a particular web page resource (e.g., banner ad, image, etc.). The segmented event tracking data based on the predetermined query can be subsequently reported to the publisher in a real-time manner. By configuring one or more different predetermined queries, time can be saved in reporting event tracking data by reducing the administrative costs with managing the real-time analytics system.

V. REAL-TIME ANALYTICS SOFTWARE ARCHITECTURE

Figure 5:
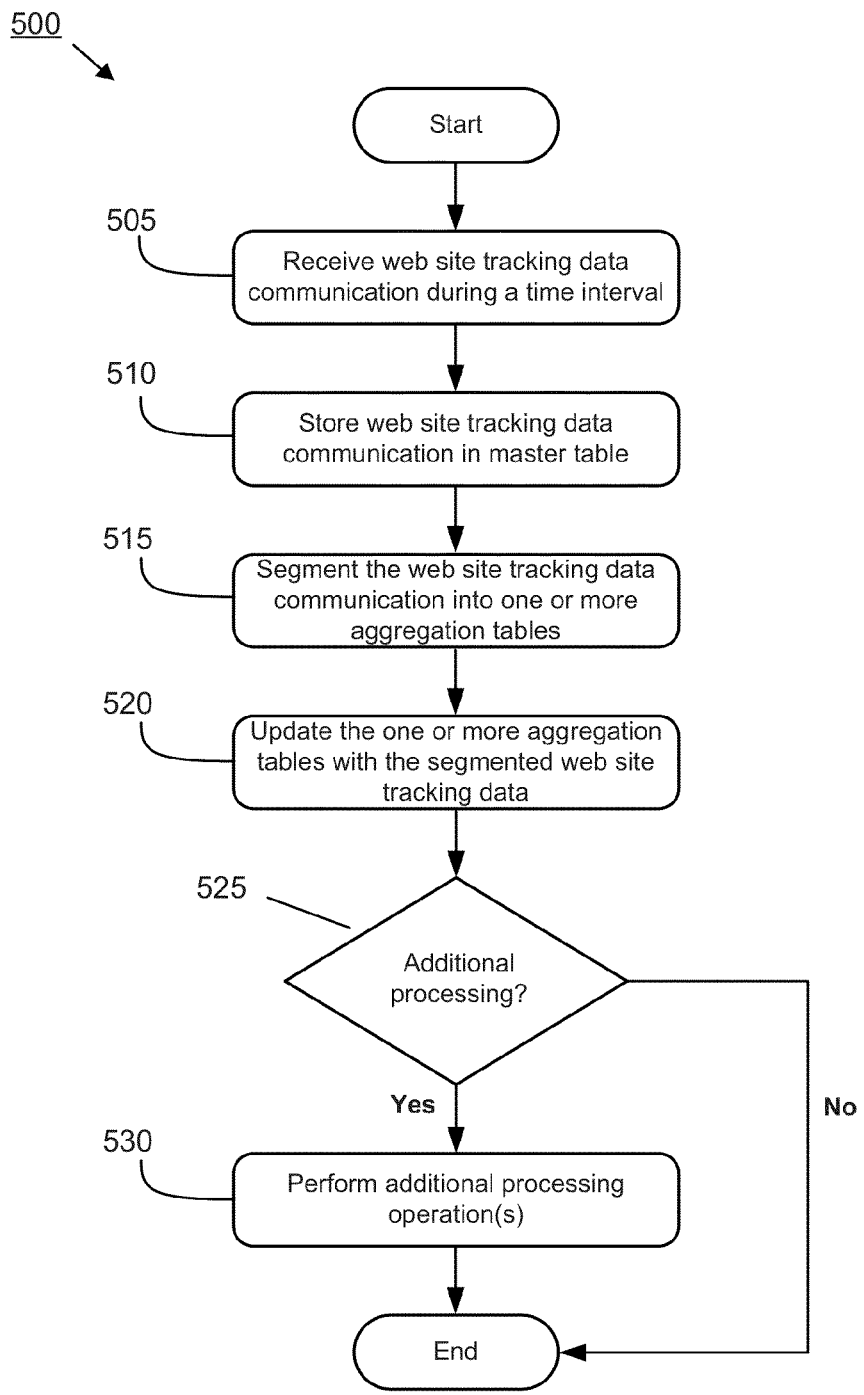
FIG. 5 conceptually illustrates an exemplary process for segmenting event tracking data over a rolling period of time for real-time analytics reporting of some configurations.

To organize the event tracking data into a contextually meaningful format for reporting the real-time analytics data with low latency, the exemplary process described below can segment the event tracking data communication into one or more aggregation tables. FIG. 5 conceptually illustrates an exemplary process 500 for segmenting event tracking data over a rolling period of time for real-time analytics reporting of some configurations. More specifically, over a rolling period of time, the process 500 continuously segments the event tracking data included in incoming event tracking data communications into one or more aggregation tables. The rolling period of time represents one or more contiguous time intervals in which the event tracking data is received and reported by the multi-tiered analytics system. Each time interval can correspond with a respective duration of time such as a number of milliseconds, seconds, minutes, etc. For example, the exemplary process in FIG. 5 can be implemented by a real-time server to segment real-time analytics data into an aggregation table(s) corresponding to a particular span of time.

The process 500 starts when an event tracking data communication is received at 505 during a span of time. The span of time in some configurations corresponds with a time interval during which web traffic data in the form of an event tracking data communication(s) is received by the multi-tiered analytics system. By reference to FIG. 1, a real-time server in the real-time analytics tier 140 receives the event tracking data communication from a logging server in the logging tier 120. In some implementations, the real-time server can receive the event tracking data communication when pushed from the logging server as mentioned before. Although the real-time server can receive the communication from the logging server, one of ordinary skill in the art would recognize that the event tracking data communication can be received from other sources and still be within the scope of the subject technology. For instance, in some configurations, the real-time server can receive the event tracking data communication from another real-time server.

At 510, the process 500 can store the event tracking data into a master table for a particular span of time. The master table of some configurations includes all data from the event tracking data communication that could be utilized for real-time analytics reporting. The process 500 could utilize the master table for different operations. For instance, in a scenario in which the process 500 requires different data than data currently included in existing aggregation tables (e.g., to satisfy a new user-defined query), the process 500 could search the master table for such data and form a new aggregation table to hold the data.

The process 500 at 515 segments the event tracking data communication into one or more aggregation tables. To accomplish this task, the process 500 can extract corresponding event tracking data included in the communication and place the extracted data into one or more aggregation tables. As discussed above, each aggregation table can include commonly searched for data for real-time analytics reporting, or include data according to a respective predetermined query (i.e., a user-defined query). The predetermined query of some configurations organizes the event tracking data based on one or more different criterion for an associated web property ID of a publisher's web site. For instance, the predetermined query can be based on user data, such as a city or other geographical location of the user. By way of example, the process 500 of some configurations segments the event tracking data communication according to a predetermined period of time for a respective associated web property ID of a publisher. In particular, the process 500 can utilize a time stamp of the event tracking data communication in order to determine the one or more aggregation tables in which the tracking data is segmented.

After segmenting the event tracking data, the process 500 at 520 updates the one or more aggregation tables with the segmented event tracking data. For instance, the process 500 can update one or more different entries in a particular aggregation table. In an example in which the particular aggregation table tracks a number of occurrences for a particular event or visitor action, the process 500 can increment a respective number/count for a particular tracked event such as a number of hits in a corresponding entry of the aggregation table. For each incoming event tracking data communication over the rolling window of time, the process 500 continuously updates corresponding entries in one or more aggregation tables to facilitate real-time analytics reporting of the event tracking data with low latency.

The process 500 then continues to 525 to determine whether an additional operation(s) is to be performed on the event tracking data. If an additional operation is performed, then the process 500 continues to 530 to perform the additional operation, otherwise the process 500 ends. Some configurations can perform filtering (e.g., removing/reducing data), sorting (e.g., ranking) and other types of processing operations on the event tracking data. For instance, the process 500 can rank the segmented event tracking data to organize the event tracking data into a specified order (e.g., most occurrence, most significant, etc.) by sorting the segmented web site track data. In an example in which the aggregation table tracks the corresponding number of hits for events or visitor actions, the process 500 can sort the segmented event tracking data according to the number of hits (e.g., ascending or descending numerical order). Alternatively, the process 500 can sort the segmented event tracking data based on a non-numerical criterion (e.g., alphabetical order), such as sorting the geographical locations respectively associated with the event tracking data in the aggregation table.

Additionally, the process 500 of some configurations can employ intelligent ranking at 530 by computing and/or assigning weights to the segmented data. One or more different factors can determine an assigned weight such as a web page associated with the visitor activity (e.g., more important pages are assigned higher/greater weight), the type of visitor activity (e.g., browsing, commenting, etc.), referrer (e.g., where the visitor came from), etc. Hence, it can be understood that the event tracking data can be qualitatively ranked according to one or more different assigned weights to respective data. The process 500 can perform qualitative ranking of the segmented data in addition or alternatively to the quantitative ranking described above.

In some configurations, the process 500 can transmit at 530 the segmented event tracking data in the corresponding aggregation table to a front-end server for reporting the event tracking data. By way of example, the process 500 can receive a query from the front-end server for the event tracking data and, in response, can transmit data that matches the query to the front-end server. Alternatively or conjunctively, the process 500 can be configured to push data from one or more aggregation tables to the front-end server without requiring the front-end server to request the data. The process 500 then ends.

Although the process 500 is described in FIG. 5 as performing the one or more additional operations after updating the aggregation tables at 520, one of ordinary skill in the art would appreciate that any of the aforementioned additional operations could be performed after receiving the event tracking data communication at 505 and/or before segmenting the event tracking data at 515. In some configurations, another operation could be performed in lieu of segmenting the event tracking data at 515. For instance, the process 500 could instead filter the event tracking data to remove data according to one or more different filter criteria. In this fashion, the process 500 could reduce the amount of event tracking data that is to be segmented at 515 to enable more efficient processing of the data.

The following description discusses exemplary data structures utilized by the process 500 described above in FIG. 5 for processing event tracking data included with incoming event tracking data communications. Over a rolling window of time, the multi-tiered real-time analytics system can temporally use corresponding aggregation tables for reporting the event tracking data with respect to a span of time.

Figure 6:
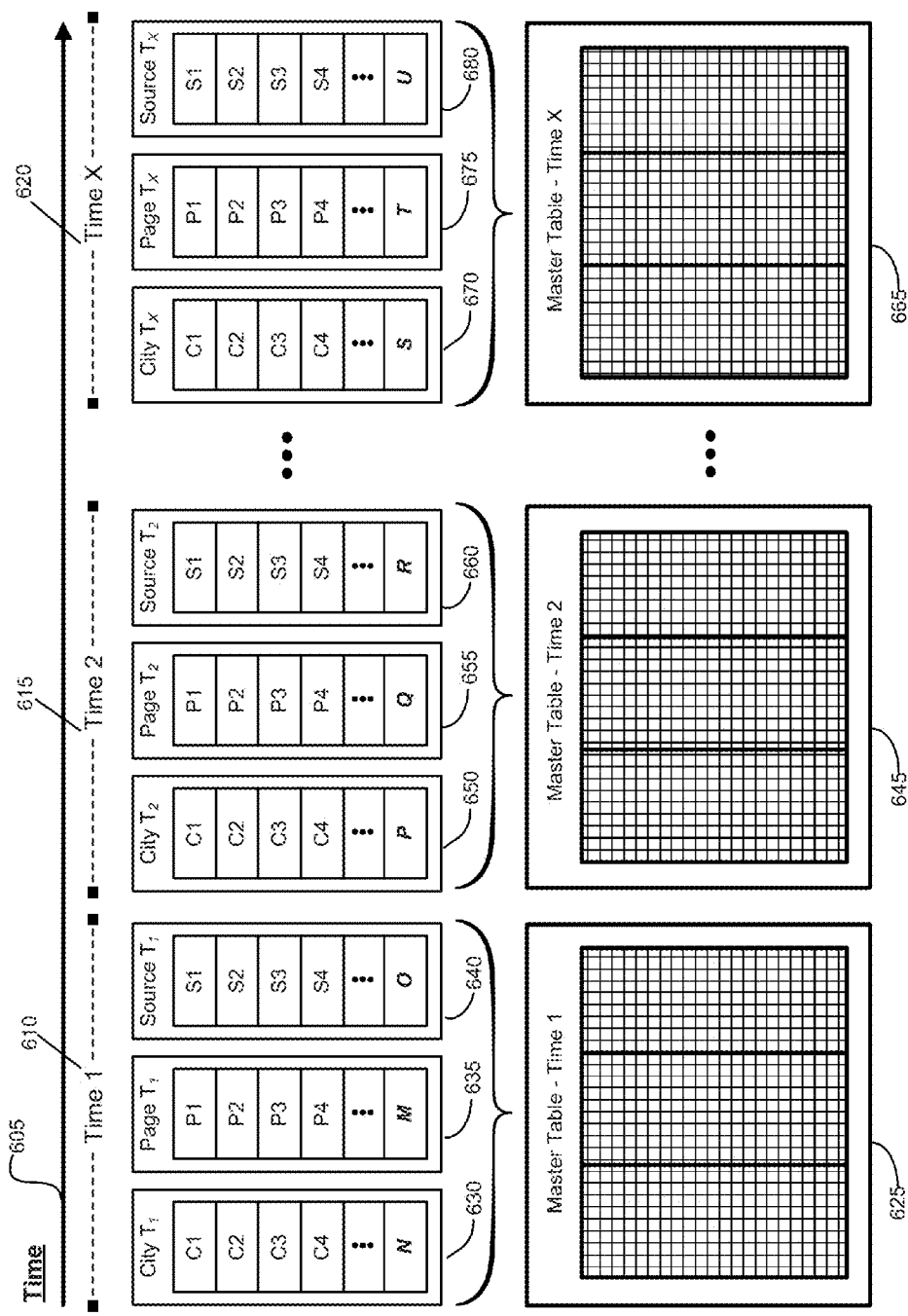
FIG. 6 conceptually illustrates exemplary data structures for one or more aggregations tables over a rolling window of time of some configurations.

FIG. 6 conceptually illustrates exemplary data structures for one or more aggregation tables over a rolling window of time of some configurations. In particular, FIG. 6 depicts a continuous timeline 605 divided into different time intervals 610, 615 and 620 (shown as Time 1 to Time X, where X is a positive integer) in which each respective time interval has associated aggregation tables for a given web property ID. Each associated aggregation table corresponds with a given time interval and includes data for one or more dimensions. A dimension can be understood as including data organized by a particular data set or category. For instance, aggregation tables can include respective dimensions related to geographical location, web page, ad source, time, type of visitor activity, etc.

Each time interval shown in FIG. 6 can represent a span of time such as, but not limited to, a number of milliseconds, seconds, minutes, etc., in which incoming event tracking data communications are segmented and processed. The real-time analytics system can configure the time interval for processing incoming event tracking data communications based on particular characteristics of the publisher's web site, and each time interval could represent the same or non-equal periods of time depending on these characteristics. For example, for a given web site with a pattern of web site traffic, a shorter time interval(s) can be set for time periods with more web site traffic while a longer time interval(s) can be set for time periods with less web site traffic. Although the time intervals 615 to 620 are shown in FIG. 6 as contiguous time intervals, some configurations can include overlapping time intervals.

As shown, the time interval 610 has several associated aggregation tables 630, 635, 640 and a master table 625. The master table 625 is formed during the time interval 610 to store all data from each received event tracking data communication during the time interval 610. In some configurations, the real-time analytics system can utilize the master table in the event that the desired event tracking data is not available in any other associated aggregation table for the time interval 610. In this instance, the real-time analytics system can search/query the master table to create a new aggregation table to store this newly segmented data. In some configurations, after this new aggregation table is created, an analogous new aggregation table is created for the each of the remaining time intervals. For example, new respective analogous aggregation tables in the time intervals 615 to 620 can be subsequently created by searching corresponding master tables for the desired event tracking data.

The associated aggregation tables 630, 635 and 640 represent exemplary data structures for storing portions of data (i.e., segmented data) also included in the master table 625. Each aggregation table can include segmented data extracted from incoming event tracking data communications. As illustrated, the aggregation tables 630, 635 and 640 respectively include tracking data related to a city (e.g., geographical location), web page (e.g., URL/URI string indicating a web address) and source of a referral (e.g., an ad source, HTTP referrer, etc.). The exemplary aggregation tables in FIG. 6 can include one or more entries. As illustrated, the aggregation tables 630, 635 and 640 respectively include N, M and O number of entries, where N, M and O are respective non-zero integer values. More specifically, the aggregation table 630 includes entries C1-C4 up to N entries for respective cities, the aggregation table 635 includes entries P1-P4 up to M entries for respective pages, and the aggregation table 640 includes entries S1-S4 up to O entries for respective sources.

For each subsequent time interval, one or more aggregation tables can be utilized that are respectively analogous to the same aggregation tables used in a prior time interval. For instance, aggregation tables 650, 655 and 660 in the time interval 615, and aggregation tables 670, 675 and 680 in the time interval 620 respectively represent analogous data structures to the aggregation tables 630, 635 and 640 in the prior time interval 610. As shown, the aggregation tables 650, 655 and 660 respectively include P, Q and R number of entries, where P, Q and R are respective non-zero integer values. More specifically, the aggregation table 650 includes entries C1-C4 up to P entries that represent respective cities, the aggregation table 655 includes entries P1-P4 up to Q entries that represent respective pages, and the aggregation table 660 includes entries S1-S4 up to R entries that represent respective sources. Similarly, the aggregation table 670 includes entries C1-C4 up to S entries that represent respective cities, the aggregation table 675 includes entries P1-P4 up to T entries that represent respective pages, and the aggregation table 660 includes entries S1-S4 up to U entries that represent respective sources.

Although the above description of FIG. 6 describes exemplary aggregation tables, one of ordinary skill in the art would appreciate that any type of aggregation table (which includes event tracking data in one or more dimensions) could be utilized by the multi-tiered analytics system for reporting real-time analytics data. As mentioned above, the multi-tiered analytics system can dynamically create additional aggregation tables according to new queries and/or to report new or different types of visitor activity and web traffic data.

The following description discusses an exemplary process for segmenting event tracking data in discrete units of time according to some configurations. Segmenting the data according to units of time enables the multi-tiered analytics system to report real-time analytics data in a finely granulated manner. In other words, the real-time web site analytics data can be reported in segments corresponding to smaller units of time.

Figure 7:
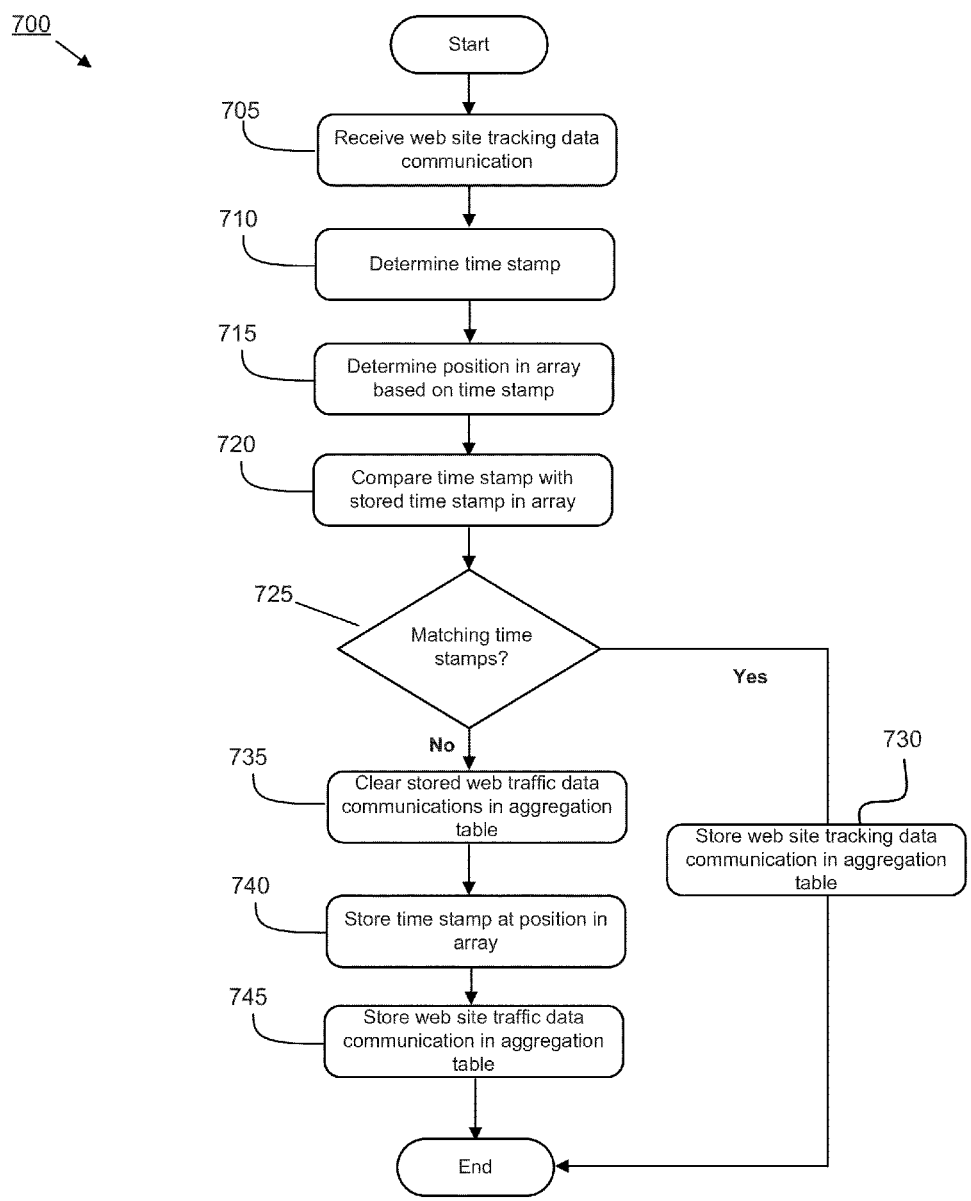
FIG. 7 conceptually illustrates an exemplary process for chronologically segmenting event tracking data of some configurations.

FIG. 7 conceptually illustrates an exemplary process 700 for chronologically segmenting event tracking data of some configurations. More specifically, the process 700 can be implemented by a real-time server to segment incoming event tracking data communications into respective aggregation tables based on a respective period of time.

The process 700 starts when an event tracking data communication is received at 705. By reference to FIG. 1, a real-time server in the real-time analytics tier 140 receives the event tracking data communication from a logging server in the logging tier 120. In some implementations, the real-time server can receive the event tracking data communication when pushed from the logging server as mentioned before. Additionally, one of ordinary skill in the art would realize that the event tracking data communication can be received from other sources and still be within the scope of the subject technology. In some configurations, the real-time server can receive the event tracking data communication from another real-time server.

At 710, the process 700 determines a time stamp for the event tracking data communication. As used herein, the term "time stamp" can be understood as a sequence of characters and/or symbols that indicates the date and/or time at which a particular event or visitor action occurred. In some instances, the process 700 can determine the time stamp as it is included in the event tracking data communication as part of the incoming request.

The process 700 continues to 715 to determine a position in an array based on the time stamp for the received event tracking data communication. In some configurations, the position in the array is determined by performing a modulo n operation on the time stamp, where n represents the size of the array. For instance, in an example where the size of the array is 60, the position in the array can be determined by performing a modulo 60 operation on the time stamp. In this example, it can be understood that the array includes sixty positions in which each position logically represents a respective second within a minute time period. The process 700 of some configurations therefore enables segmentation of the event tracking data according to the size of the array, where each position in the array can be a logical representation of a specific division of time (e.g., second, minute, hour, etc.).

Based on the determined position, the process 700 at 720 compares the time stamp with a stored time stamp at the determined position in the array. For instance, some configurations respectively store associated time stamps for one or more positions in the array for incoming event tracking data communications. Each stored time stamp can reference one or more different aggregation tables that segment the event tracking data according to different respective predetermined queries.

Based on the comparison at 720, the process 700 can decide at 725 whether the time stamps match. In an instance in which the time stamps match one another, the process 700 continues to 745 to store the event tracking data communication based on a particular predetermined query in an aggregation table referenced from the position in the array. Further, as discussed above in reference to FIG. 5, after the event tracking data communication is stored in the aggregation table, the tracking data stored in the aggregation table can be sorted (i.e., ranked according to a specified ordering scheme) according to one or more predetermined criteria (e.g., a number of hits, geographical location, etc.). The process 700 then ends.

Alternatively, in an instance in which the time stamps do not match, the process 700 continues to 735 to clear (i.e., erase or delete) one or more (if any) stored web site traffic data entries in the aggregation table referenced from the position in the array. The process 700 at 740 stores the time stamp at the position in the array. At 745, the process 700 then stores the web site traffic data communication in the aggregation table referenced from the position in the array according to the predetermined query. The process 700 then ends.

In some configurations, the array is referenced from an associative array with one or more entries. One form of an associative array can be a hash table with one or more entries. Each hash table entry can represent a respective web property identity for a particular publisher. The expression "hash table" as used herein can be understood as a data structure including one or more unique keys and corresponding one or more values in which each key is associated with one or more values. In this manner, a hash table of web property identities can be provided to enable segmenting the data according to an associated publishers web property identity (e.g., for a particular web site).

Although a hash table is described above, one of ordinary skill in the art would realize other data structures can be utilized and still be within the scope of the subject technology. By way of example, some configurations can use binary search trees and/or linked lists of key/value pairs for referencing the above described array.

Figure 8:
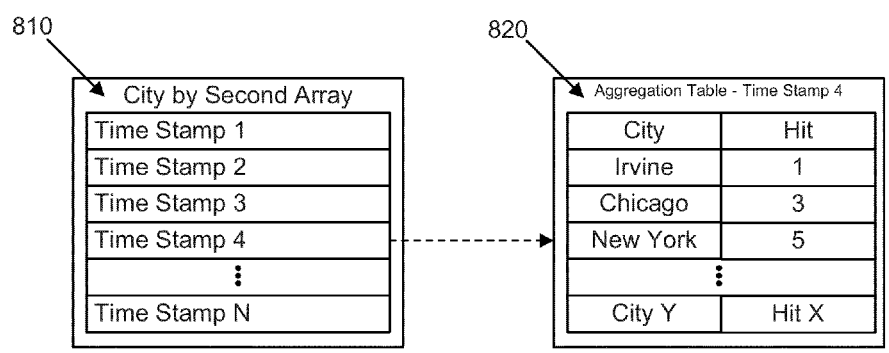
FIG. 8 conceptually illustrates exemplary data structures for segmented event tracking data and an associated aggregation table of some configurations.

The following discussion describes exemplary data structures that could be used by the processes 500 and 700 described above in FIGS. 5 and 7 for segmenting incoming event tracking data communications. FIG. 8 conceptually illustrates exemplary data structures for segmented event tracking data and an associated aggregation table of some configurations. More specifically, FIG. 8 depicts an exemplary array of time stamps and a corresponding aggregation table referenced from one particular time stamp entry in the array. The illustrated data structures of FIG. 8 will be described by reference to corresponding portions of FIG. 6.

As shown in FIG. 8, an array 810 includes one to N time stamp entries. The array 810 conceptually represents a city by second array in which each time stamp entry includes a reference to an aggregation table that segments the event tracking data according to a geographical location (i.e., the city) and tracks associated hits for each respective geographical location associated with the event tracking data. Some configurations can include an array with sixty entries in which each entry/position in the array logically represents a different second within a minute.

A particular entry in the array 810 can include a reference to a corresponding aggregation table. For instance, as illustrated in FIG. 8, the entry representing "Time Stamp 4" includes a reference/pointer to an aggregation table 820. Referring to FIG. 6, each entry in the aforementioned array 810 can reference a corresponding aggregation table in the time intervals 610-620. As mentioned above, in the example where the array 810 includes sixty entries (i.e., each entry/position in the array logically represents a different second within a minute), each array entry can reference a corresponding aggregation table in a respective time interval in the timeline 605 corresponding to a respective second within a minute.

As illustrated, the aggregation table 820 includes segmented event tracking data based on the geographical location (i.e., the city) associated with the event tracking data. In this example, the aggregation table 820 includes two columns for one to Y entries corresponding to respective geographical locations and an associated number/count of hits. In other words, the aggregation table 820 keeps a count of hits/requests for each geographical location. Referring to FIG. 5, the process 500 can update the aggregation table at 520 to increment the count as shown in the aggregation table 820 in FIG. 8 and then sort the entries in the aggregation table 820 to rank the entries in a specified order (e.g., ascending or descending). As depicted in FIG. 8, the aggregation table 820 ranks the entries in ascending order by the number of hits. Referring to FIG. 6, the aggregation table 820 can be included in a corresponding time interval (i.e., one of the time intervals 610-620) in the timeline 605. For instance, in an example where the aggregation table 820 corresponds with a time X, the aggregation table 820 can be included the time interval 620. All event tracking data included in the aggregation 820 can also be included in the master table 665 in the time interval 620. Additionally, analogous tables to the aggregation table 820 can be included in each of the remaining time intervals in the timeline 605.

The following section describes a software architecture of a real-time server that can implement the above described processes and data structures as a computer program running on a particular machine, such as a computer, or stored as instructions in a computer readable medium.

Figure 9:
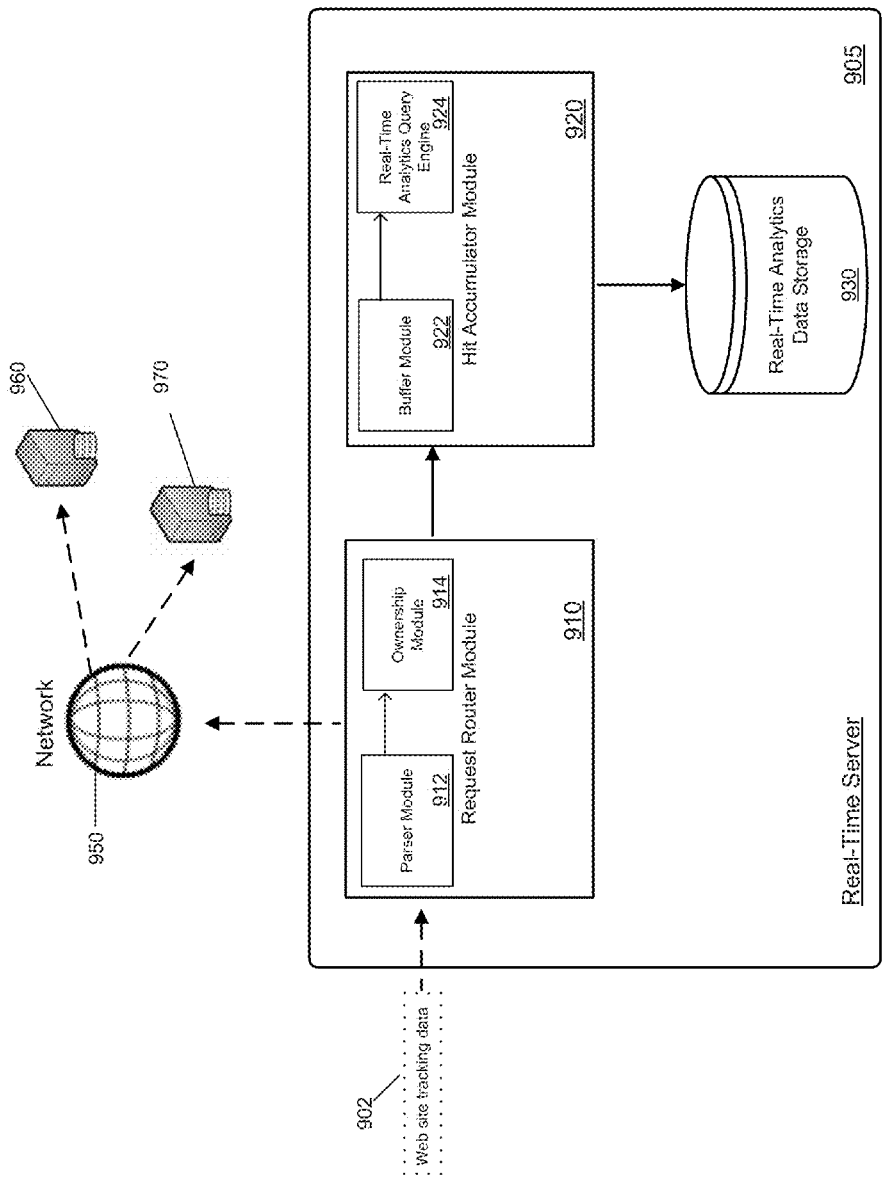
FIG. 9 conceptually illustrates an exemplary software architecture of an real-time server of some configurations.

FIG. 9 conceptually illustrates an exemplary software architecture of a real-time server 905 of some configurations. In particular, FIG. 9 shows various modules and components of the real-time server 905 for implementing the above described processes in FIGS. 2, 3, 5 and 7 and the data structures in FIGS. 4, 6 and 8. In some configurations, the software architecture of the real-time server is part of a server-based implementation running a particular machine connected to a network.

As illustrated in FIG. 9, the real-time server 905 can include a request router module 910 for parsing and routing event tracking data, a hit accumulator module 920 for buffering and querying real-time analytics data, and a real-time analytics data storage 930 for temporarily storing real-time analytics data. The real-time analytics data storage 930 in some implementations is a type of volatile and non-persistent storage (e.g., RAM). The operation of the aforementioned modules of the real-time server 905 are discussed in the following description.

The real-time server 905 can receive event tracking data 902 in a request router module 910. The event tracking data 902 can be in the form of an event tracking data communication that is received over a network 950. As shown, the request router module 910 includes a parser module 912 and an ownership module 914. The parser module 912 of some implementations can parse the event tracking data to extract real-time analytics data and to subsequently transmit the real-time analytics data to the ownership module 914. The ownership module 914 determines a set of associated real-time servers that are owners of the event tracking data corresponding with a publisher's web site. In an instance where the ownership module 914 determines that the event tracking data 902 is not associated with the real-time server 905, the request router module 910 can route the event tracking data 902 over the network 950 to other associated real-time servers. As shown in FIG. 9, additional real-time servers 960 and 970 are connected to the network 950. Alternatively, in the event that the ownership module 914 determines that the real-time server 905 is associated with the event tracking data 902, the request router module 910 routes (i.e., sends) the event tracking data to the hit accumulator module 920 for further processing and temporary storage.

The hit accumulator module 920 receives the event tracking data routed from the request router module 910. In some implementations, the hit accumulator module 920 includes a buffer module 922 as shown for queuing/aggregating the event tracking data. The buffer module 922 can be implemented in different ways. For instance, the buffer module 922 could utilize a first-in first-out (FIFO) scheme in which the earliest received event tracking data is transferred out before later received data. In other instances, the buffer module 922 could employ a last-in first-out (LIFO) scheme that is analogous to a stack in which the later received data is transferred out before earlier received data.

As shown in FIG. 9, the buffer module 922 then sends event tracking data to a real-time analytics query engine 924 in the hit accumulator module 920. The real-time analytics query engine 924 of some configurations performs query processing and data management of the real-time analytics data storage 930. By way of example, the real-time analytics query engine 924 can perform write and/or update operations to temporarily store the event tracking data to the real-time analytics data storage 930. Given the requirements of low latency involved with reporting real-time analytics data, the real-time analytics data storage 930 can be implemented to provide fast access to stored real-time analytics data. In particular, the real-time analytics data storage 930 can be implemented as fast non-persistent/volatile memory that is periodically flushed and/or overwritten with more recent event tracking data. In this manner, the overhead of managing the data in the real-time analytics data storage 930 is reduced because longevity of the data is not a primary objective.

In some implementations, the hit accumulator module 920 can execute queries for sorting and/or aggregating the received event tracking data for temporary storage in the real-time analytics data storage 930. For instance, referring back to FIG. 1, a real-time server from the real-time analytics tier 140 can aggregate and sort the real-time analytics data according to one or more predetermined queries for temporary storage and then send the aggregated and/or sorted real-time analytics data to the front-end tier 150 for reporting the real-time analytics data. As shown in FIG. 9, the real-time analytics query engine 924 of hit accumulator module 920 can execute the queries in order to sort and/or aggregate the received event tracking data before temporarily storing the real-time analytics data in the real-time analytics data storage 930. The real-time server 905 can then send the stored aggregated and/or sorted real-time analytics data to a front-end server for reporting and/or presenting real-time analytics data to an end-user.

Moreover, the hit accumulator module 920 can be configured to segment the received event tracking data into one or more different aggregation tables. For instance, referring back to FIG. 5, the process 500 at 515 segments the event tracking data communication into one or more aggregation tables. As shown in FIG. 9, the real-time analytics query engine 924 of hit accumulator module 920 can extract event tracking data from the buffer module 922 for placement into one or more different aggregation tables in the real-time analytics data storage 930. Referring to FIG. 6, the one or more aggregation tables can correspond to the different tables in the time intervals 610-620 shown in the timeline 605. Having placed the extracted web site tracking data into the different aggregation tables, the aggregation tables can provide selected data to the real-time analytics query engine 924 of hit accumulator module 920 based on queries from the real-time analytics query engine 924 for reporting to the front-end server.

VI. FRONT END WEB SITE TRAFFIC DATA REPORTING

The real-time analytics query engine 924 of the hit accumulator module 920 can execute queries to process real-time web site tracking data (e.g., web site traffic data) for a web site to generate a graphical representation of a path taken by visitors to the web site. The path can be, for example, a most common path taken by visitors to the web site, a most recent path taken by visitors to the web site, or another user-defined path. The path can also include locations within a web page a visitor visited (e.g., by identifying activity, such as mouse clicks, within the web page), and be limited by characteristics of the visitor. For instance, the most common path taken by visitors to a web site can be limited by geographical region, such that separate pathing reports can be displayed for visitors to the web site from the United States and visitors to the web site from China (e.g., so that the publisher can determine how the geographic origin of visitors influence their path). The queries executed by the real-time analytics query engine 924 can be pre-configured queries associated with the aggregation tables or incoming queries from the front-end tier 150. The incoming queries from the front-end tier 150 include user-defined queries that are executable at the time the user defines the query, such that the user receives real-time web site traffic data substantially immediately in response to defining and submitting the user-define query. The incoming queries from the front-end tier 150 also include previously defined user queries that are saved by the front-end tier 150 for later or repeated execution by the real-time analytics query engine 924.

By way of example, the hit accumulator module 920 can use a query to process, for a web site, real-time web site tracking data temporarily stored in the real-time analytics tier 140, and identify web pages on the web site that visitors have recently visited and the order in which they visited them. The hit accumulator module 920 can then push the information on the visitors to the front-end tier 150, which will display a graphical representation of the information. The graphical representation may be a directed tree for viewing by the web site's publisher. As discussed in more detail below, the publisher can use the graphical user interface to view other real-time web site tracking data for the publisher's web site(s), including more detailed information on the path taken by visitors to the web site.

The identification of the path taken by visitors to the web site can be based on, for example, the IP address of the visitors. Thus, when a visitor with an identified IP address traverses from one web page on the web site to another web page on the web site, the visitor can be identified using their IP address. No information other than the visitors IP address is obtained, and the visitor's personal identity is not identifiable based on their IP address. When the visitor first visits a web page on the web site, and when the visitor last visits a web page on the web site, those web pages can be identified as the entrance web page and the exit web page for the visitor, respectively. For example, if the visitor is not identified on the web site for a predetermined amount of time, the last page the visitor was associated with can be identified as the visitor's exit web page. As the visitor continues to visit web pages on the web site, the hit accumulator module 920 pushes updated information on the visitor to the front-end tier 150, which will then update the display of the graphical representation of the visitor's path on the web site.

Figure 10:
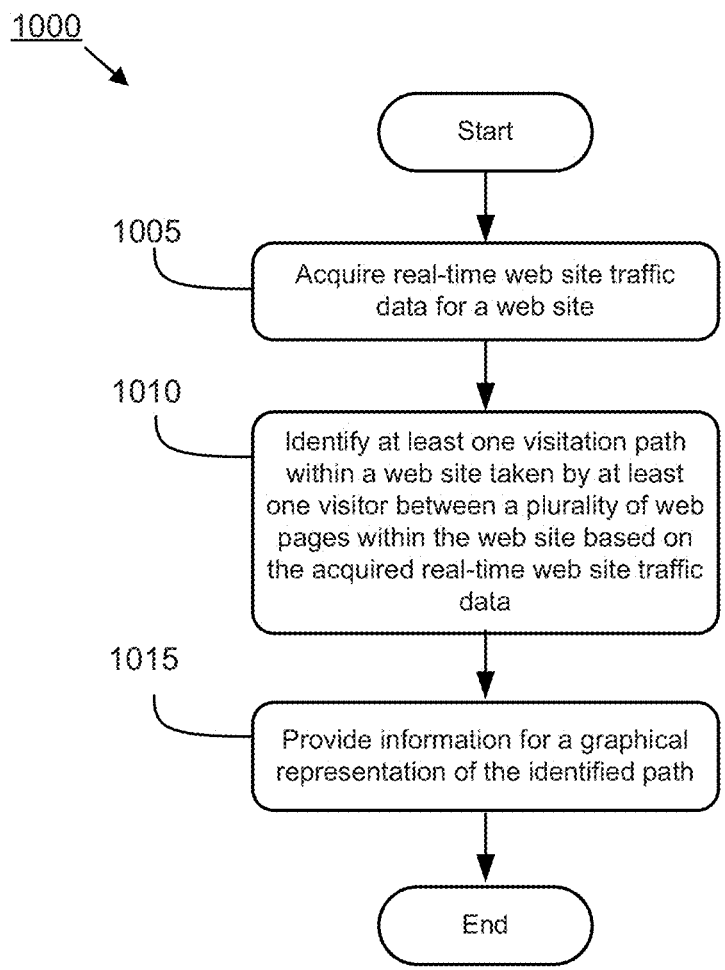
FIG. 10 conceptually illustrates an exemplary process for providing information to a graphical user interface for displaying web site traffic information using the multi-tiered real-time analytics system of some configurations.

FIG. 10 conceptually illustrates an exemplary process 1000 for providing information to a graphical user interface for displaying web site traffic information using the multi-tiered real-time analytics system 100 of some configurations. The exemplary process 1000 of FIG. 10 can be implemented by the real-time analytics query engine 924 of the hit accumulator module 920 and/or the front-end tier 150. The process 1000 may run continuously using the real-time analytics query engine 924 and display data in a user interface using the front-end tier 150. The process 1000 at 1005 acquires low latency or real-time web site traffic data for a web site. For instance, the web site traffic data can include web site tracking data for the web site. At 1010, the process 1000 identifies at least one path taken by at least one visitor between a plurality of web pages for the web site based on the acquired real-time web site traffic data for the web site. At 1015, the process 1000 provides information for a graphical representation of the identified path. In certain aspects, the front-end tier 150 displays the provided information for the graphical representation of the identified path after the front-end tier 150 receives the information pushed from the real-time analytics query engine 924 of the real-time tier 140. The graphical representation of a visitor's path can take many forms, including, for example, a tree with nodes. In certain aspects, the tree can be a directed tree that provides more information on the direction of the path of a visitor when visiting the web site.

Each node in the tree can represent a web page on the web site, and an edge between two nodes represents a visitor traversing between the web pages on the web site represented by the two nodes. One node (a "group node") can also represent a group of nodes having related content. The determination of whether the content of two web pages is related can be determined manually by user input, or automatically. Automatic grouping determinations can be based on, for example: whether the two web pages contain similar display content (e.g., they both describe a similar subject); whether a single visitor, on average, usually visits both web pages (e.g., based on either real-time or historical web traffic data); and whether the two web pages are located in the same directory on a server or share a similar file name, are visited around the same time or were generated around the same time, are associated with the same type of user activity, are commonly referred to by the same source, are commonly the target of the same search or referral, have a similar number of visits or hits, are commonly identified using the same search terms, or are associated with the same or similar anomalous web traffic behavior.

Similar to the grouping of nodes, nodes can be selected for removal from a graphical representation of one or many visitors' paths on the web site either manually by user input (e.g., a user defining specific web pages to not appear in the graphical representation) or automatically. Automatic removal of nodes from the graphical representation can be based on, for example: time data (e.g., a recently reduced rate of web traffic for the web page associated with the node); geo-location data (e.g., no additional visitors from a geographic location to a web page associated with the node); activity type data (e.g., a lack of visitor interaction with a web page associated with the node); source data (e.g., a reduced number of referrals to a web page associated with the node); target data (e.g., a web page associated with a node no longer being the final or exit page for visitors); visitor data (e.g., a reduced number of unique viewers of a web page associated with a node); visit data (e.g., a reduced number of current sessions of unique visitors to a web page associated with a node): hit data (e.g., a reduced number of current hits on a web page associated with a node); advertisement data (e.g., a lack of current advertisement selections on a web page associated with a node); search term data (e.g., current search queries no longer being directed to a web page associated with a node); web page content data (e.g., a change to what the web page associated with the node is about); and anomaly data for the web page associated with the node (e.g., a lack of anomalous web site traffic to a web page associated with a node).

The format of each node in a tree can include the position of the node, whether the node highlighted, the size of the node, the shape of the node, the color of the node, whether sound is associated with the node, and whether the node is animated. The formatting for each node can be selected based on, for example, time data (e.g., current rate of web traffic for the web page associated with the node), geo-location data (e.g., geographic location of a visitor visiting a web page associated with the node), and activity type data (e.g., how a visitor interacts with a web page associated with the node). The formatting for each node can also be selected based on source data (e.g., a referrer of the visitor to a web page associated with the node), target data (e.g., the final or exit page a visitor visits on the web site associated with the node), visitor data (e.g., current unique viewers of a web page associated with a node), visit data (e.g., current sessions of unique visitors for a web page associated with a node), and hit data (e.g., current hits on a web page associated with a node). The formatting for each node can further selected based on advertisement data (e.g., current advertisement selections on a web page associated with a node), search term data (e.g., current search terms used to be directed to a web page associated with a node), web page content data (e.g., what the web page associated with the node is about), and anomaly data for the web page associated with the node.

The real-time analytics query engine 924 of the hit accumulator module 920 is configured to identify an anomaly for a web page associated with a node by comparing real-time web site tracking data for the web page with historical web site tracking data for the web page. As discussed above with reference to FIG. 1, the collecting tier 110 receives incoming web site tracking data communications from the network 105 and provides the web site tracking data communications to the logging tier 120. The logging tier 120 then routes the received web site tracking data communications to the persistent tier 130 for persistent storage as historical web site tracking data in the persistent tier 130. Historical web site tracking data is thus accessible from the persistent tier 130 for comparison with real-time web site tracking data temporarily stored in the real-time analytics tier 140. Exemplary historical web site tracking data includes, for example, time data (e.g., historical rate of web traffic for a web site over a certain period of time), geo-location data (e.g., past web traffic for a web site from geographic locations), activity type data (e.g., past web browsing activities of visitors on the web site), source data (e.g., past referrers to the web site), target data (e.g., past destinations on the web site), visitor data (e.g., past unique viewers of a web site), visit data (e.g., past sessions of unique visitors of a web site), and hit data (e.g., past hits of a web site). Other exemplary types of historical web site tracking data include advertisement data (e.g., past advertisement selections on a web site) and search term data (e.g., historical search terms used to be directed to a web site).

By comparing real-time web site tracking data with historical web site tracking data, an anomaly can be detected. For example, if the hit accumulator module 920 identifies that historical web site tracking data shows an average visitor rate per minute for a web page of 0.8 visitors per minute for the previous day, but 15 visitors have visited the web page in the last two minutes, then information on the anomaly can be displayed with the node associated with the web page, or the formatting of the node can be adjusted based on the identification of the anomaly (e.g., by tracing the node in a dotted line).

The queries executed by the real-time analytics query engine 924 to process web site tracking data (e.g., web site traffic data) to identify anomalies in web site traffic for a web page can use various anomaly detection techniques, including identifying an anomaly using thresholds and/or statistics. Various statistical considerations include frequencies, percentiles, means, variances, covariances, and standard deviations. For instance, the real-time analytics query engine 924 can execute a query to identify an anomaly when historical web site tracking data shows an average hit rate per minute from Tokyo for a web page that is at least one standard deviation away from the current (i.e., real-time) average hit rate per minute from Tokyo for the web page. Other anomaly detection techniques can also be used, including rule-based systems (e.g., characterizing normal web site traffic using a set of rules and detecting variations therefrom). For instance, a rule is defined in a rule-based system that creates an exception for high web site traffic for e-commerce on pre-defined high web site traffic days, such as the day after Thanksgiving Day. On the day after Thanksgiving Day, the real-time analytics query engine 924 detects that the current (i.e., real-time) hit rate for an online shopping web site's web page is ten times greater than the hit rate for the web page from the previous day, Thanksgiving Day. Although web page traffic has increased ten fold, the real-time analytics query engine 924 does alter the format of a node associated with the web page due to the rule excepting high web site traffic for e-commerce web sites on the day after Thanksgiving.

Another anomaly detection technique is profiling (e.g., building profiles of normal web site traffic behavior and detecting variations therefrom). For instance, a profile for normal web site traffic behavior indicates that there is greater web site traffic during the waking hours of 6:00 AM to 12:00 AM, and less web site traffic during the resting hours of 12:00 AM to 6:00 AM. A node is formatted based on the detection of an anomaly when there is significantly greater web site traffic for a web page associated with a node during the resting hours than during the waking hours. Additional anomaly detection techniques include model based approaches (e.g., developing a model to characterize normal web site traffic and detecting variations therefrom), and distance based methods (e.g., by computing distances among points).

Exemplary types of web site tracking data that can be used in anomaly detection for node formatting in a tree include time data (e.g., comparing a current rate of web traffic with a historical rate of web traffic over a certain period of time), geo-location data (e.g., comparing current web traffic from one geographic location with historical of web traffic from that geographic location), and activity type data (e.g., comparing current activities of visitors on a web site with historical activities of visitors on the web site). Source data (e.g., comparing current referrers to a web site with historical referrers to the web site) and target data (e.g., comparing current destinations on a web site with historical destinations on the web site) can also be used in anomaly detection. Visitor data (e.g., comparing current unique viewers of a web site with historical unique viewers of the web site), visit data (e.g., comparing current sessions of unique viewers of a web site with historical sessions of unique visitors of the web site), and hit data (e.g., comparing current hits of a web site with historical hits of the web site) can further be used in anomaly detection. Yet further exemplary types of web site tracking data include advertisement data (e.g., comparing current advertisement selections on a web site with historical advertisement selections on the web site) and search term data (e.g., comparing current search terms used to be directed to a web site with historical search terms used to be directed to the web site).

Figure 11A:
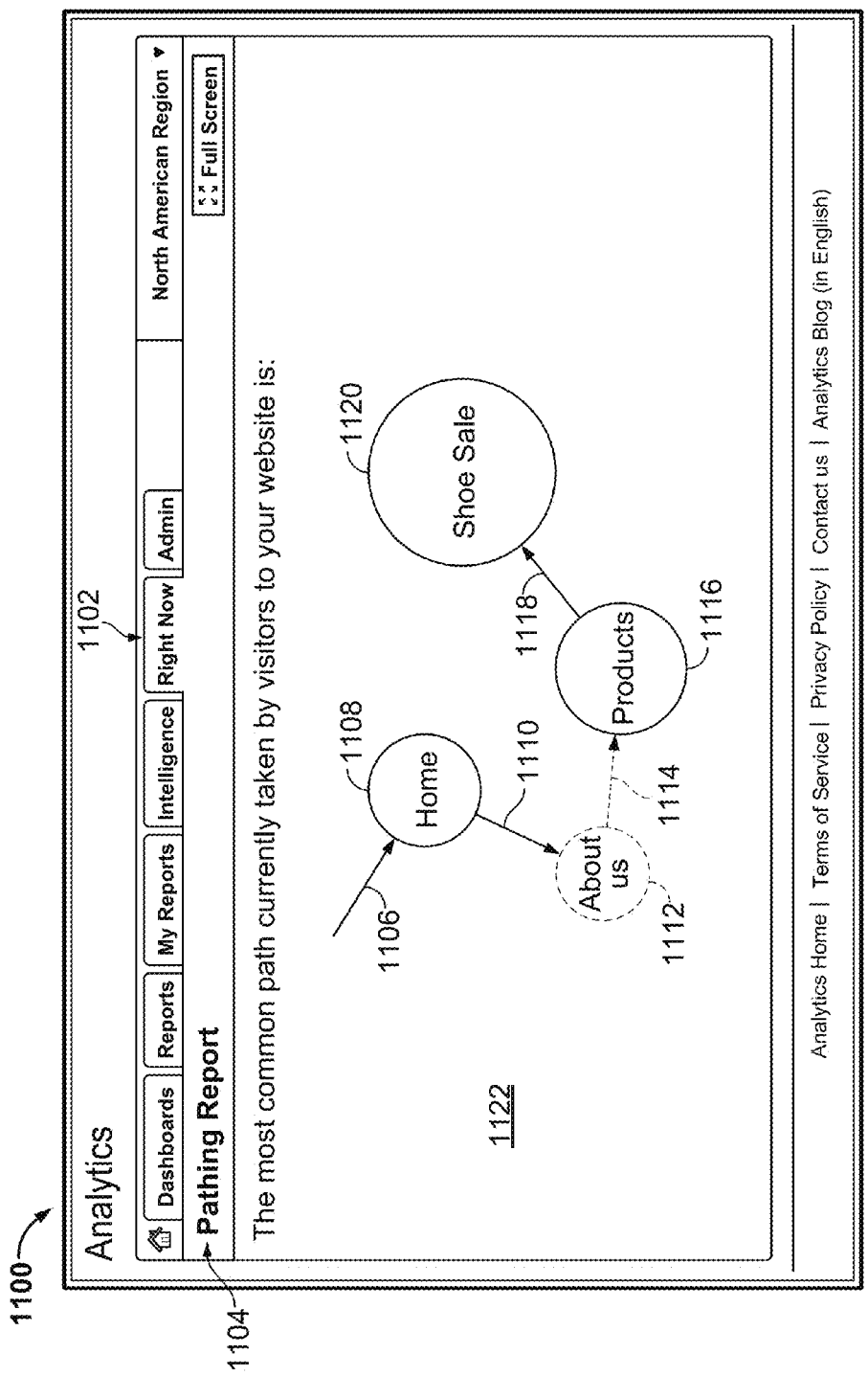
FIGS. 11A and 11B illustrate exemplary screenshots from graphical user interfaces for displaying web site traffic information.
Figure 11B:
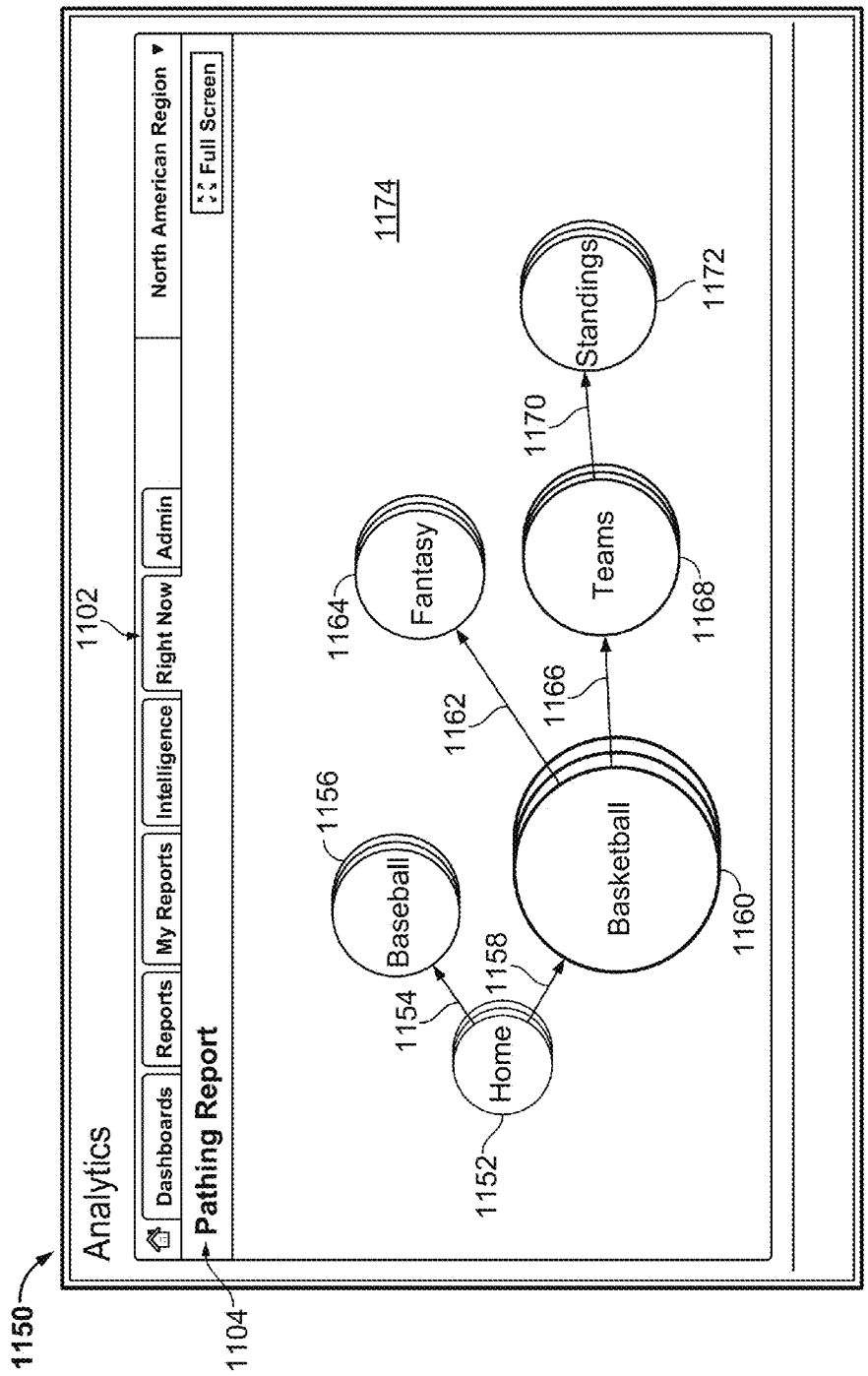

FIGS. 11A and 11B illustrate exemplary screenshots 1100 and 1150 from front-end graphical user interfaces for displaying web site traffic information. Each exemplary screenshot 1100 and 1150 includes a graphical representation of an identified visitor path on a web site in the form of a directed tree. Each front-end user interface can be accessible as a web interface service running on the front-end tier 150, or as a client software application connected to the front-end tier 150. In certain aspects, the front-end user interface is an interface to be provided by the multi-tiered real-time analytics system 100 disclosed herein. Accordingly, a user, such as a publisher, can authorize the real-time analytics system 100 to begin tracking web site traffic data for the publisher's web site(s). The publisher can limit access to information on the tracked web site traffic data based on the publisher's preferences, including, for instance, an authentication protocol (e.g., username and password access to the user interface). In certain aspects, identification of the publisher is limited to the identification of the web site to be tracked, and the publisher can opt out of having a web site tracked at any time.

The publisher can use each user interface to view information on historical web site traffic data and low latency web site traffic data for the publisher's web site(s) in addition to viewing information on the path taken by visitors to the publisher's web site. The user interface is viewable on many types of devices and applications, such as, but not limited to, web browsers and other software applications, mobile devices, tablet devices, thin clients, and thick clients.

The user interface screenshot 1100 of FIG. 11A is a front-end user interface displaying a web page titled "Pathing Report" 1104 that provides information on visitor path information for a publisher's web site using real-time web site traffic. The web page is accessible by selecting a tab titled "Right Now" in the user interface 1102 in order to access information on real-time web site traffic data. The information provided on the web page includes a graphical representation, in directed tree form, of the most common path currently taken by visitors to a website. Edge 1106 of the path tree 1122 illustrates that most visitors enter the web site on the "Home" 1108 web page, and then proceed to the "About us" 1112 web page as indicated by edge 1110. Most visitors then proceed to the "Products" 1116 page as indicated by edge 1114, followed by proceeding to the "Shoe Sale" 1120 web page as indicated by edge 1118. The "Shoe Sale" 1120 web page is the most common exit web page, as illustrated by the lack of any outward directed edges proceeding from the "Shoe Sale" web page node.

The formatting of various edges and nodes in the path tree 1122 are different. Specifically, the thicker/heavier edges 1110 and 1118 illustrates that the real-time web site traffic data for the "Shoe Sale" web page indicates more visitors traverse the thicker/heavier edges 1110 and 1118 (e.g., from nodes 1108 to 1110 and nodes 1116 to 1120 respectively) than the thinner/lighter edges 1106 and 1114 in the path tree 1122. Similarly, the size of the nodes 1108, 1112, 1116, and 1120 indicate the number of visitors to the web page associated with the node. For instance, the node 1120 for the "Shoe Sale" web page is larger than the other nodes 1108, 1110, and 1116 because real-time web site traffic data for the "Shoe Sale" web page indicates that it is currently receiving more hits than the other web pages. Lastly, the node 1112 associated with the "About Us" web page is illustrated with a dotted line because real-time web site traffic data for the "About Us" web page indicates that it is receiving anomalous web site traffic, namely, that there are an usually large number of visitors to the "About us" page from Mexico. The information on the anomaly can be displayed to the user by the user clicking on the node 1112 or doing a mouse-over on the node 1112.

The publisher can use the information from the front-end user interface of FIG. 11A to reorganize and/or modify the web site to optimize visitor traffic and use of the web site. For example, because the "Shoe Sale" web page has been identified as receiving the most real-time hits, a link to the "Shoe Sale" web page can be placed on the most common entrance page, the "Home" page, so that the "Shoe Sale" web page is more easily accessible (e.g., one mouse click away from the "Home" page). Similarly, because the "About Us" web page has been identified as receiving an unusual number of visitors from Mexico, the publisher can quickly provide a Spanish translation of the "About Us" web page on the web site.

The user interface of FIG. 11B is an exemplary screenshot 1150 of another front-end user for displaying web site traffic information. Specifically, the user interface screenshot 1150 of FIG. 11B is a front-end user interface displaying a web page titled "Pathing Report" 1104 that provides information on visitor path information for a publisher's web site using real-time web site traffic. The web page is accessible by selecting a tab titled "Right Now" in the user interface 1102 in order to access information on real-time web site traffic data. The information provided on the web page includes a graphical representation, in directed tree form, of the most recent viewing pattern of visitors to a web site using groups of nodes. The root node 1152 for the "Home" web page indicates that most visitors enter the web site at the "Home" web page. Some visitors recently then either visited "Baseball" web pages (e.g., indicated by the "Baseball" group of nodes 1156), but most visitors instead recently visited "Basketball" web pages (e.g., indicated by the larger sized "Basketball" group of nodes 1160 as compared to the "Baseball" group node 1156, and the heavier edge 1158 to the "Basketball" group node 1160 as compared to the lighter edge 1154 to the "Baseball" group node 1156). A group node representing a group of web pages (e.g., "Basketball" nodes 1160) is distinguished from a single node representing a single web page (e.g., "Home" node 1152) by graphically presenting stacked multiple nodes. A user can expand a group node into individual nodes by clicking on the group node.

From the "Basketball" group node 1160, some visitors recently visited the "Fantasy" web pages (e.g., indicated by the "Fantasy" group node 1164), but more visitors most recently visited the "Teams" web pages (e.g., indicated by the larger size of the "Teams" group node 1168 and the heavier edge 1166). From the "Teams" group node 1168, visitors recently visited the "Standings" web pages (e.g., indicated by the "Standings" group node 1172).

The publisher can use the information from the front-end user interface of FIG. 11B to reorganize and/or modify the web site to optimize visitor traffic and use of the web site. For example, because fewer recent visitors are visiting the "Baseball" web pages, the publisher can place a link to the "Baseball" web pages more prominently on the "Home" web page.

Each front-end user interface of FIGS. 11A and 11B is automatically and continuously updated using real-time web site traffic data information pushed from the hit accumulator module 920 to the front-end tier 150. Thus, the publisher does not need to query the user interface to update the information, such as by hitting a refresh button in a web browser. Similarly, when a path or a node is no longer relevant, such as when real-time web site traffic data indicates a significant reduction in web site traffic to a node, the formatting of the information on the node can be adjusted or the node can be removed completely. The publisher can further configure the user interface to display additional real-time web site traffic information for a node or group of nodes, including, for example time data, geo-location data, activity type data, source data, target data, visitor data, visit data, hit data, advertisement data, search term data, web page content data, and anomaly data.

VII. ELECTRONIC SYSTEM

The following section describes an exemplary system that implements aspects of the above-described invention.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software inventions can be implemented as sub-parts of a larger program while remaining distinct software inventions. In some implementations, multiple software inventions can also be implemented as separate programs. Finally, any combination of separate programs that together implement a software invention described here is within the scope of the invention. In some implementations, the software programs, when installed to operate on one or more systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 12:
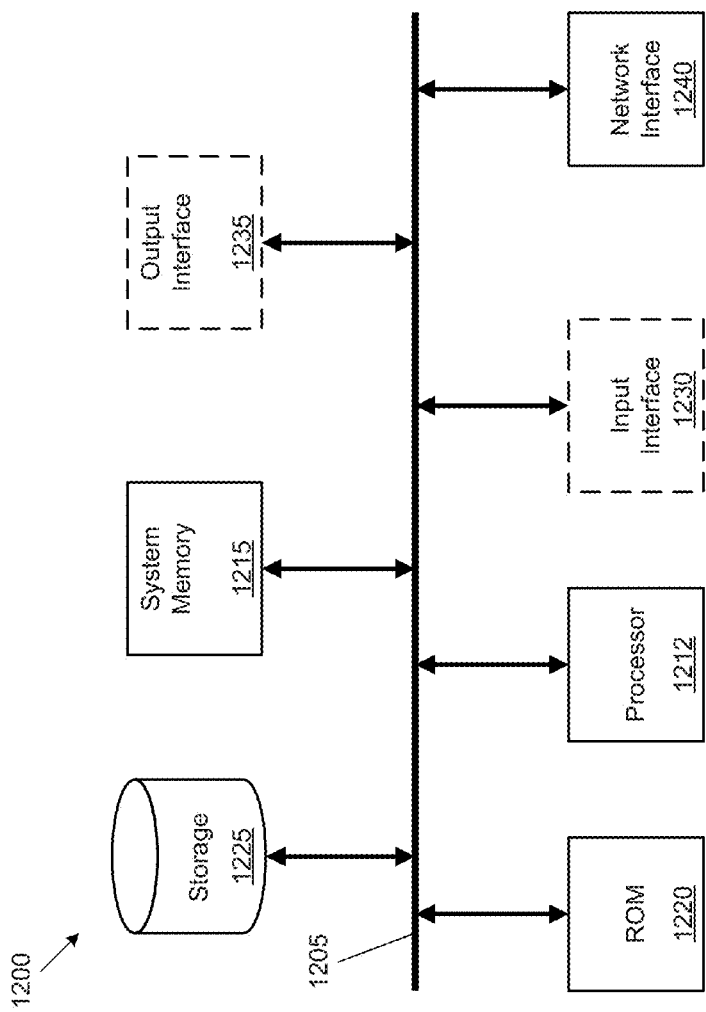
FIG. 12 conceptually illustrates an electronic system in which some configurations are implemented.

FIG. 12 conceptually illustrates a system 1200 with which some implementations of the subject technology may be implemented. The system 1200 can be a computer, phone, PDA, or any other sort of electronic device. Such a system includes various types of computer readable media and interfaces for various other types of computer readable media. The system 1200 includes a bus 1205, processing unit(s) 1210, a system memory 1215, a read-only memory 1220, a storage device 1225, an optional input interface 1230, an optional output interface 1235, and a network interface 1240.

The bus 1205 collectively represents all system, peripheral, and chipset buses that communicatively connect the numerous internal devices of the system 1200. For instance, the bus 1205 communicatively connects the processing unit(s) 1210 with the read-only memory 1220, the system memory 1215, and the storage device 1225.

From these various memory units, the processing unit(s) 1210 retrieves instructions to execute and data to process in order to execute the processes of the invention. The processing unit(s) can be a single processor or a multi-core processor in different implementations.

The read-only-memory (ROM) 1220 stores static data and instructions that are needed by the processing unit(s) 1210 and other modules of the system 1200. The storage device 1225, on the other hand, is a read-and-write memory device. This device is a non-volatile memory unit that stores instructions and data even when the system 1200 is off. Some implementations of the invention use a mass-storage device (such as a magnetic or optical disk and its corresponding disk drive) as the storage device 1225.

Other implementations use a removable storage device (such as a flash drive, a floppy disk, and its corresponding disk drive) as the storage device 1225. Like the storage device 1225, the system memory 1215 is a read-and-write memory device. However, unlike storage device 1225, the system memory 1215 is a volatile read-and-write memory, such a random access memory. The system memory 1215 stores some of the instructions and data that the processor needs at runtime. In some implementations, the invention's processes are stored in the system memory 1215, the storage device 1225, and/or the read-only memory 1220. For example, the various memory units include instructions for processing multimedia items in accordance with some implementations. From these various memory units, the processing unit(s) 1210 retrieves instructions to execute and data to process in order to execute the processes of some implementations.

The bus 1205 also connects to the optional input and output interfaces 1230 and 1235. The optional input interface 1230 enables the user to communicate information and select commands to the system. The optional input interface 1230 can interface with alphanumeric keyboards and pointing devices (also called "cursor control devices"). The optional output interface 1235 can provide display images generated by the system 1200. The optional output interface 1235 can interface with printers and display devices, such as cathode ray tubes (CRT) or liquid crystal displays (LCD). Some implementations can interface with devices such as a touchscreen that functions as both input and output devices.

Finally, as shown in FIG. 12, bus 1205 also couples system 1200 to a network interface 1240 through a network adapter (not shown). In this manner, the computer can be a part of a network of computers (such as a local area network ("LAN"), a wide area network ("WAN"), or an Intranet, or an interconnected network of networks, such as the Internet. Any or all components of system 1200 can be used in conjunction with the invention.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method for providing information to a graphical user interface for displaying web site traffic information, the method comprising:
    collecting, at a collecting tier, a first low latency web site traffic data for a web site;
    pushing, from the collecting tier, the first low latency web site traffic data to a logging tier;
    pushing, from the logging tier, the first low latency web site traffic data to a real-time analytics tier;
    indexing, at the real-time analytics tier, using a first time stamp associated with the first low latency web site traffic data, an array element of an array, the array element comprising a time interval and a plurality of references, each corresponding to a respective aggregation table, each of the aggregation tables storing data of a different type;
    comparing the first time stamp with the time interval;
    determining, responsive to the first time stamp falling within the time interval, a reference from the plurality of references, the reference corresponding to an aggregation table of a data type of a first associated data associated with the first low latency web site traffic data;
    updating the referenced aggregation table by incrementing a hit data corresponding to the first associated data;
    collecting, at the collecting tier, a second low latency web site traffic data for the web site;
    pushing, from the collecting tier, the second low latency web site traffic data to the logging tier;
    pushing from the logging tier, the second low latency web site traffic data to the real-time analytics tier;
    indexing, using a second time stamp associated with the second low latency web site traffic data, the array element;
    comparing the second time stamp with the time interval;
    storing, responsive to the second time stamp falling outside the time interval, a new time interval in the array element based on the second time stamp;
    deleting all entries of the referenced aggregation table;
    adding an entry to the referenced aggregation table, the entry comprising a second associated data associated with the second low latency web site traffic data and a hit data of one;
    pushing, from the real-time analytics tier, the first low latency web site traffic data to a front-end tier when the first low latency web site traffic data is received within a threshold amount of time;
    identifying, at the front-end tier, a first visitation path of a first visitor of the web site based on the first low latency web site traffic data, the first visitation path comprising a plurality of web pages within the web site; and
    providing, at the front-end tier, the identified first visitation path to a graphical user interface for display.

2. The method of claim 1, wherein the identifying a first visitation path comprises
    identifying, at the front-end tier, a first visitation path based on an IP address of the first visitor.

3. The method of claim 1, further comprising
    representing the identified first visitation path graphically as a directed tree comprising:
    (i) a plurality of nodes, each corresponding to a web page; and
    (ii) a plurality of edges.

4. The method of claim 3, further comprising
    formatting each node based on a type of first low latency web site traffic data, the type selected from one of time data, geo-location data, activity type data, source data, target data, visitor data, visit data, hit data, advertisement data, or search term data.

5. The method of claim 3, further comprising
    formatting the plurality of nodes and plurality of edges by setting one of position, highlighting, size, shape, color, sound, and animation.

6. The method of claim 3, wherein representing the identified visitation path further comprises:
    grouping a set of nodes associated with web pages having related content; and
    representing the set of nodes as a single node.

7. The method of claim 3, further comprising
formatting a node or an edge to indicate a web page from which the first visitor entered the web site.

8. The method of claim 3, further comprising
formatting a node or an edge to indicate a web page from which the first visitor exited the web site.

9. The method of claim 3, further comprising
formatting the directed tree to indicate a most common visitation path.

10. The method of claim 3, further comprising
formatting the directed tree to indicate a most recent visitation path.

11. The method of claim 1, further comprising:
pushing, from the real-time analytics tier, the second low latency web site traffic data to the front-end tier when the second low latency web site traffic data is received within a threshold amount of time;
identifying, at the front-end tier, a second visitation path of a second visitor of the web site based on the second low latency web site traffic data;
aggregating the first and the second visitation paths; and
providing, at the front-end tier, the aggregated visitation path to a graphical user interface for display.

12. A system for providing information to a graphical user interface for displaying web site traffic information, the system comprising:
a collecting tier, in connection with a network and a logging tier, the collecting tier having a server including a processor executing the steps of
collecting a first low latency web site traffic data,
pushing the first low latency web site traffic data to a logging tier,
collecting a second low latency web site traffic data,
pushing the second low latency web site traffic data to the logging tier;
a logging tier, in connection with the collection tier and a real-time analytics tier, the logging tier having a server including a processor executing the steps of
pushing the first low latency web site traffic data to a real-time analytics tier,
pushing the second low latency web site traffic data to the real-time analytics tier;
a real-time analytics tier, in connection with the logging tier and a front-end tier, the real-time analytics tier having a server including a processor executing the steps of
indexing, using a first time stamp associated with the first low latency web site traffic data, an array element of an array, the array element comprising a time interval and a plurality of references, each corresponding to a respective aggregation table, each of the aggregation tables storing data of a different type,
comparing the time stamp with the time interval,
determining, responsive to the first time stamp falling within the time interval, a reference from the plurality of references, the reference corresponding to an aggregation table of a data type of a first associated data associated with the first low latency web site traffic data,
updating the referenced aggregation table by incrementing a hit data corresponding to the first associated low latency web site traffic data,
indexing, using a second time stamp associated with the second low latency web site traffic data, the array element,
comparing the second time stamp with the time interval,
storing, responsive to the second time stamp falling outside the time interval, a new time interval in the array element based on the second time stamp,
deleting all entries of the referenced aggregation table,
adding an entry to the referenced aggregation table, the entry comprising a second associated data associated with the second low latency web site traffic data and a hit data of one,
pushing the first low latency web site traffic data to a front-end tier when the first low latency web site traffic data is received within a threshold amount of time; and
a front-end tier, in connection with the real-time analytics tier, the front end tier having a server including a processor executing the steps of
identifying a first visitation path of a first visitor of the web site based on the first low latency web site traffic data, the first visitation path comprising a plurality of web pages within the web site, and
providing the identified first visitation path to a graphical user interface for display.

13. The system of claim 12, wherein the front-end tier identifying a first visitation path comprises
identifying a first visitation path based on an IP address of the first visitor.

14. The system of claim 12, wherein the front-end tier further comprises
representing the identified first visitation path graphically as a directed tree comprising:
(i) a plurality of nodes each corresponding to a web page; and
(ii) a plurality of edges.

15. The system of claim 14, wherein the front-end tier further comprises
formatting each node based on a type of first low latency web site traffic data, the type selected from one of time data, geo-location data, activity type data, source data, target data, visitor data, visit data, hit data, advertisement data, or search term data.

16. The system of claim 14, wherein the front-end tier further comprises
formatting the plurality of nodes and plurality of edge by setting one of position, highlighting, size, shape, color, sound, and animation.

17. The system of claim 14, wherein the front-end tier representing the identified visitation path further comprises:
grouping a set of nodes associated with web pages having related content; and
representing the set of nodes as a single node.

18. The system of claim 14, wherein the front-end tier representing the identified visitation path further comprises
formatting a node or an edge to indicate a web page from which the first visitor entered the web site.

19. The system of claim 14, wherein the front-end tier representing the identified visitation path further comprises
formatting a node or an edge to indicate a web page from which the first visitor exited the web site.

20. The system of claim 14, wherein the front-end tier representing the identified visitation path further comprises
formatting the directed tree to indicate a most common visitation path.

21. The system of claim 14, wherein the front-end tier representing the identified visitation path further comprises
formatting the directed tree to indicate a most recent visitation path.

22. The system of claim 12, wherein the real-time analytics tier further comprises pushing the second low latency web site traffic data to the front-end tier when the second low latency web site traffic data is received within a threshold amount of time; and wherein the front-end tier further comprises:
identifying a second visitation path of a second visitor of the web site based on the second low latency web site traffic data;
aggregating the first and the second visitation paths; and
providing the aggregated visitation path to a graphical user interface for display.

\* \* \* \* \*